United States Patent
Sergyeyenko et al.

(10) Patent No.: US 10,680,446 B2
(45) Date of Patent: Jun. 9, 2020

(54) BATTERY PACK CHARGER SYSTEM

(71) Applicant: Black & Decker Inc., Newark, DE (US)

(72) Inventors: Oleksiy P. Sergyeyenko, Baldwin, MD (US); Jason F. Busschaert, Bel Air, MD (US); Sean Bailey, Baltimore, MD (US)

(73) Assignee: Black & Decker Inc., New Britain, CT (US)

( * ) Notice: Subject to any disclaimer, the term of this patent is extended or adjusted under 35 U.S.C. 154(b) by 318 days.

(21) Appl. No.: 15/687,179

(22) Filed: Aug. 25, 2017

(65) Prior Publication Data
US 2019/0067955 A1 Feb. 28, 2019

(51) Int. Cl.
*H02J 7/00* (2006.01)

(52) U.S. Cl.
CPC ............ *H02J 7/0013* (2013.01); *H02J 7/007* (2013.01); *H02J 7/0045* (2013.01); *H02J 7/0047* (2013.01); *H02J 7/0049* (2020.01)

(58) Field of Classification Search
CPC .............................. H02J 7/0013; H02J 7/0045
USPC .................................. 320/107, 111, 113, 134
See application file for complete search history.

(56) References Cited

U.S. PATENT DOCUMENTS

| | | | |
|---|---|---|---|
| D288,432 S | 2/1987 | Nagele | |
| 7,291,041 B1 | 11/2007 | Yang et al. | |
| 7,589,494 B2 | 9/2009 | Yang et al. | |
| 7,659,696 B2* | 2/2010 | Zeiler | H02J 7/0027 320/107 |
| 9,077,053 B2 | 7/2015 | Schneider et al. | |
| 2011/0286168 A1* | 11/2011 | Scheucher | H02J 7/0045 361/679.01 |
| 2012/0001590 A1 | 1/2012 | Yeh et al. | |
| 2013/0057076 A1 | 3/2013 | Lavender et al. | |
| 2014/0266048 A1 | 9/2014 | Cunanan et al. | |
| 2015/0084431 A1 | 3/2015 | Yeh | |
| 2015/0303717 A1 | 10/2015 | Schneider et al. | |

FOREIGN PATENT DOCUMENTS

| | | |
|---|---|---|
| CN | 201167110 Y | 12/2008 |
| TW | M314968 U | 7/2007 |

* cited by examiner

*Primary Examiner* — Edward Tso
*Assistant Examiner* — Aaron Piggush
(74) *Attorney, Agent, or Firm* — Michael Aronoff

(57) ABSTRACT

A battery pack charger system may include a first charger configured to charge a first battery pack, a second charger configured to charge a second battery pack, a support arranged between the first charger and the second charger, and a power cord configured to deliver power. The first charger may be attached on a first side of the support and the second charger may be attached on a second side of the support that is opposite the first side of the support. The first charger and the second charger may be arranged directly opposite of each other. The power cord may be connected to one of the first charger or the second charger.

17 Claims, 16 Drawing Sheets

BATTERY PACK CHARGER SYSTEM

TECHNICAL FIELD

This description relates to a battery pack charger system.

BACKGROUND

Users of cordless devices discharge their battery packs faster than they can charge them. Power sources (e.g., AC outlet, DC cigarette lighter outlet, etc.) for charging the battery packs are often unavailable or limited and/or do not provide enough power and energy to keep up with demand.

SUMMARY

In one general aspect, a battery pack charger system may include a first charger configured to charge a first battery pack, a second charger configured to charge a second battery pack, a support arranged between the first charger and the second charger, and a power cord configured to deliver power. The first charger may be attached on a first side of the support and the second charger may be attached on a second side of the support that is opposite the first side of the support. The first charger and the second charger may be arranged directly opposite of each other. The power cord may be connected to one of the first charger or the second charger.

Implementations may include one or more of the following features. For example, the support may include a platform configured to support the first charger on the first side and the second charger on the second side, and a projecting part configured to support the first battery pack on the first side and the second battery pack on the second side. The projecting part may separate the first battery pack and the second battery pack from each other. The projecting part may extend away from the platform in relation to a longitudinal direction of the first battery pack and the second battery pack. The platform may include a first pair of pedestals on the first side to connect to a pair of screw bosses formed on the first charger and a second pair of pedestals on the second side to connect to a pair of screw bosses formed on the second charger. The first charger may include a first connecting structure and the second charger may include a second connecting structure that is same as the first connecting structure. The first connecting structure may include guide rails configured to engage corresponding guide rails of a slide-on style battery pack, and the second connecting structure may include guide rails configured to engage corresponding guide rails of a slide-on style battery pack.

The first charger may include a controller (control circuit) configured to receive and deliver power associated with the first battery pack, determine an amount of charge of the first battery pack, and supply a charge to the first battery pack. The second charger may include a controller (control circuit) configured to deliver power to the second charger via the first charger, determine an amount of charge of the second battery pack, and supply a charge to the second battery pack.

The battery pack charger system may further include a power brick. The power brick may be attached to one of the first charger or the second charger. The power brick may be encased in a casing to protect the power brick. The casing may include a pair of guide rails to correspondingly engage with guide rails of one of the first battery charger or the second battery charger when one of the first battery pack or the second battery pack is removed from the respective first charger or the second charger. The casing may include openings to permit an electrical cord of the power brick to be wrapped within the openings.

In another general aspect, a battery pack charger system may include a first charger, a second charger, a support arranged between the first charger and the second charger, and a power brick configured to deliver power. The first charger may be attached on a first side of the support and the second charger may be attached on a second side of the support that is opposite the first side of the support. The first charger and the second charger may be arranged directly opposite of each other.

Implementations may include one or more of the following features. For example, the power brick may be configured to be connectable to the first charger and/or the second charger, and a battery pack may be configured to be connectable to the other first charger and/or the second charger. Each of the first charger and the second charger may include a housing configured to receive at least one of the power brick and the battery pack, and a pair of reinforcing members. The pair of reinforcing members may extend at sides of the housing. The pair of reinforcing members may include a securing device configured to secure an electrical cord of the power brick.

In another general aspect, a method of forming a battery pack charger system having a first charger and a second charger includes arranging a support between the first charger and the second charger, attaching the first charger to a first side of the support, attaching the second charger to a second side of the support that is opposite the first side, arranging the first charger and the second charger directly opposite of each other, and delivering power via a power cord connected to one of the first charger or the second charger.

The details of one or more implementations are set forth in the accompanying drawings and the description below. Other features will be apparent from the description and drawings.

DETAILED DESCRIPTION

Example embodiments relate to a battery pack charger system including a first charger configured to charge a first battery pack, a second charger configured to charge a second battery pack, and a support arranged between the first charger and the second charger. The first charger may be attached on a first side of the support and the second charger may be attached on a second side of the support that is opposite the first side of the support. In one implementation, the first charger and the second charger may be configured directly opposite of each other. This permits a user to charge more than one battery pack at a time while saving space and charging time.

The battery pack charger system includes one power cord to charge multiple, removable battery packs. For example, the power cord may be attached to a primary (first) charger to deliver power and charge the first battery pack, and to a secondary (second) charger to charge a second battery pack. Power may be delivered to the primary charger and then to the secondary charger. Alternatively, power may be delivered to the primary charger and the secondary charger simultaneously. The charging energy may be used to charge the multiple, removable battery packs, which may be used to provide power to various cordless equipment. For example, the removable battery packs may be used to provide power to cordless power tools, cordless lawn tools, cordless radios, etc. The battery pack may be implemented to connect to various different equipment such that the same battery pack may be used on different equipment (e.g., the same battery pack may be used on various different equipment having similar connecting structure with the battery pack).

Figure 1:
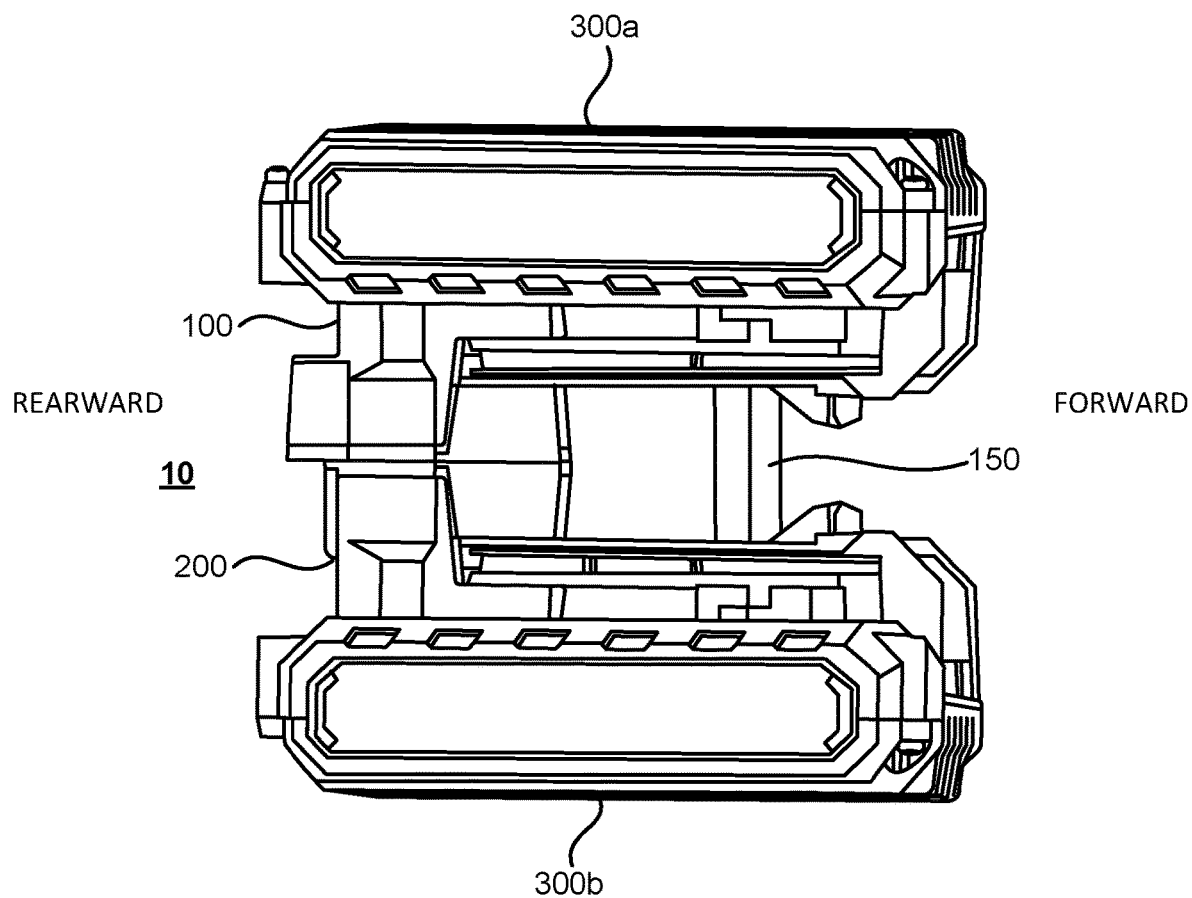
FIG. 1 is a perspective view of a battery pack charger system in accordance to an example embodiment.

FIG. 1 is a perspective view of a battery pack charger system 10 in accordance to an example embodiment. Referring to FIG. 1, the battery pack charger system 10 includes a first charger 100 for charging a removable first battery pack 300a, a second charger 200 for charging a removable second battery pack 300b, and a support 150 arranged between the first charger 100 and the second charger 200 to separate the first battery pack 300a and the second battery pack 300b.

The first and second battery packs 300a, 300b are arranged directly opposite of each other (since the respective charging ports of chargers 100, 200 are arranged directly opposite of each other). In other words, the first and second battery packs 300a, 300b directly face each other. To describe in another manner, a side of the first battery pack 300a employing terminal slots for receiving terminal blades and a side of the second battery pack 300b employing terminal slots for receiving terminal blades are arranged to face each other (i.e., directly opposite of each other). This configuration permits a user to charge more than one battery pack at a time while saving space and time for charging. In addition, the first battery pack 300a and the second battery pack 300b are oriented such that the first battery pack 300a and the second battery pack 300b do not interfere or otherwise contact each other during a charging stage of the batteries.

In some implementations, the battery packs 300a, 300b may be a slide-on style battery pack and may have a voltage ranging from 9 volts to 24 volts, for example. In some implementations, the battery packs 300a, 300b may have the same number of battery cells and store similar energy. For example, the battery packs 300a, 300b may include ten battery cells that can store about 55 Watt-hours of energy. In other implementations, the battery packs 300a, 300b may be compact battery packs having half the number of battery cells. For example, the battery packs 300a, 300b may include five battery cells that can store about 27 Watt-hours of energy. In still other implementations, the battery packs 300a, 300b may have different number of battery cells and stored energy. For example, the first battery pack 300a may include ten battery cells that can store about 55 Watt-hours of energy, and the second battery pack 300b may include five battery cells that can store about 27 Watt-hours of energy.

In some implementations, the battery packs 300a, 300b may include high energy cells capable of storing about 72 Watt-hours to deliver power for longer period of time. In some implementations, the first battery pack 300a and the second battery pack 300b may include any combination of cells. In addition, the battery pack charger system 10 may support any combination of compact, standard, or high energy battery packs.

The illustrated battery pack charger system 10 may be configured to charge any of a plurality of different types of battery packs. For example, the battery pack charger system 10 may be capable of charging battery packs 300a, 300b having nickel-metal hydride ("NiMH"), nickel-cadmium ("NiCad"), lithium-cobalt ("Li—Co"), lithium-manganese ("Li-Ion"), Li—Mn spinel, or other suitable lithium or lithium-based chemistries. In some implementations, the battery pack charger system 10 may make a determination of the type of battery pack inserted into the charger 100 and/or 200 based on, for example, a terminal voltage. In other implementations, the charger 100 and/or 200 may receive information or a signal from the battery pack 300a or 300b which indicates a battery pack type.

The battery pack charger system 10 may also be configured to receive and charge battery packs 300a, 300b having any number of different voltage ratings, capacity ratings, configurations, shapes, and sizes. For example, the battery charger 10 may be operable to charge battery packs 300a, 300b having voltage ratings of 4V, 8V, 12V, 14.4V, 16V, 18V, 20V, 24V, 48V, etc., or battery packs having any voltage rating therebetween. The battery charger system 10 may also be operable to charge battery packs 300a, 300b having individual cells with capacity ratings of 1.2 Ah, 1.3 Ah, 1.4 Ah, 2.0 Ah, 2.4 Ah, 2.6 Ah, 3.0 Ah, etc. The individual cell capacity ratings are combined to produce a total battery pack capacity rating, which is based both on the capacity ratings of the individual cells, the number of cells in each battery pack 300a, 300b and the manner in which the cells are connected to each other.

It should be appreciated that in the exemplary embodiment described with respect to FIG. 1 the battery packs 300a, 300b are the same (or substantially identical) and therefore, the components and/or elements described for the first battery pack 300a may be used to describe the second battery pack 300b, and vice versa.

Figure 2:
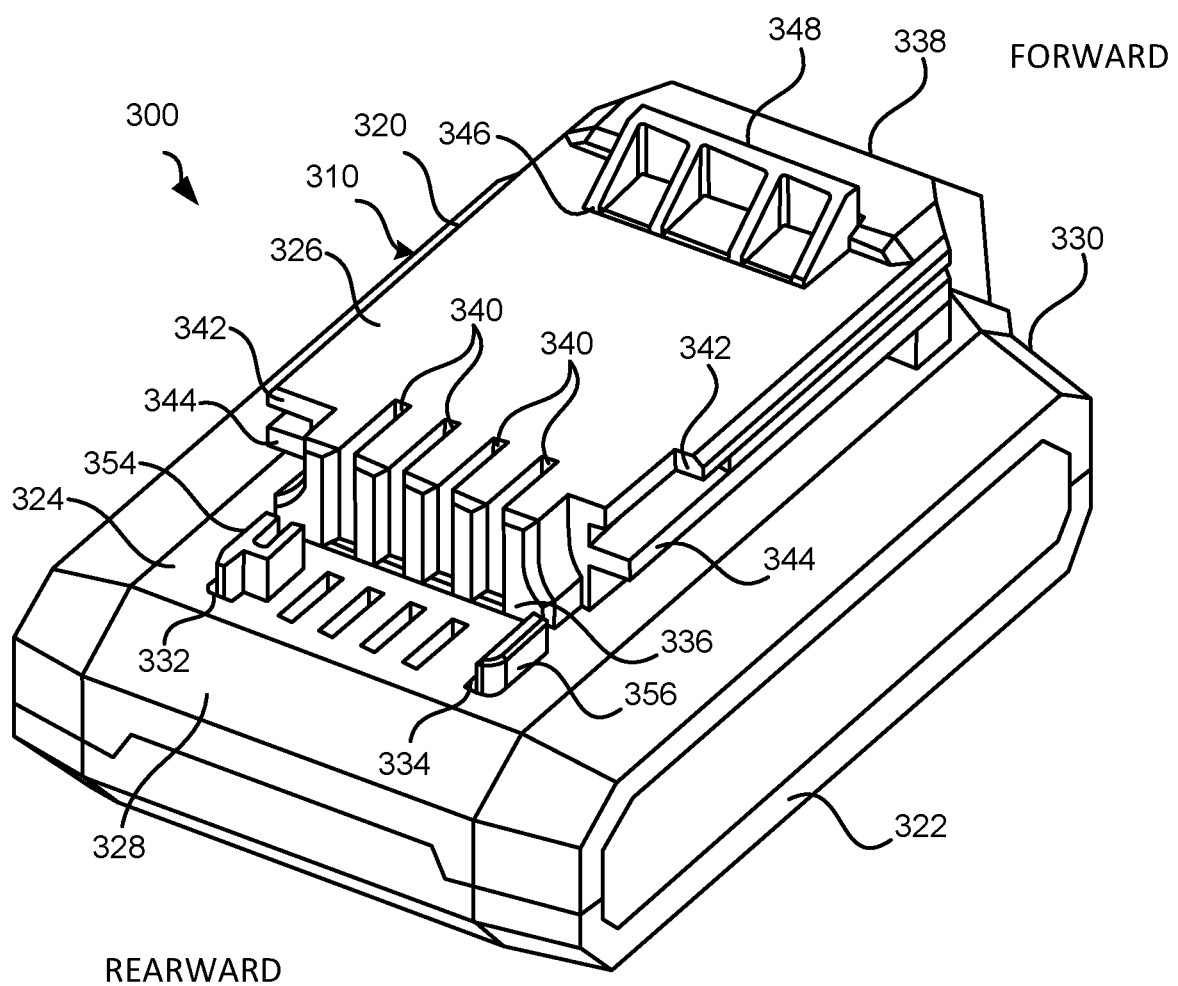
FIG. 2 is a perspective view of a battery pack of the battery pack charger system of FIG. 1.
Figure 3:
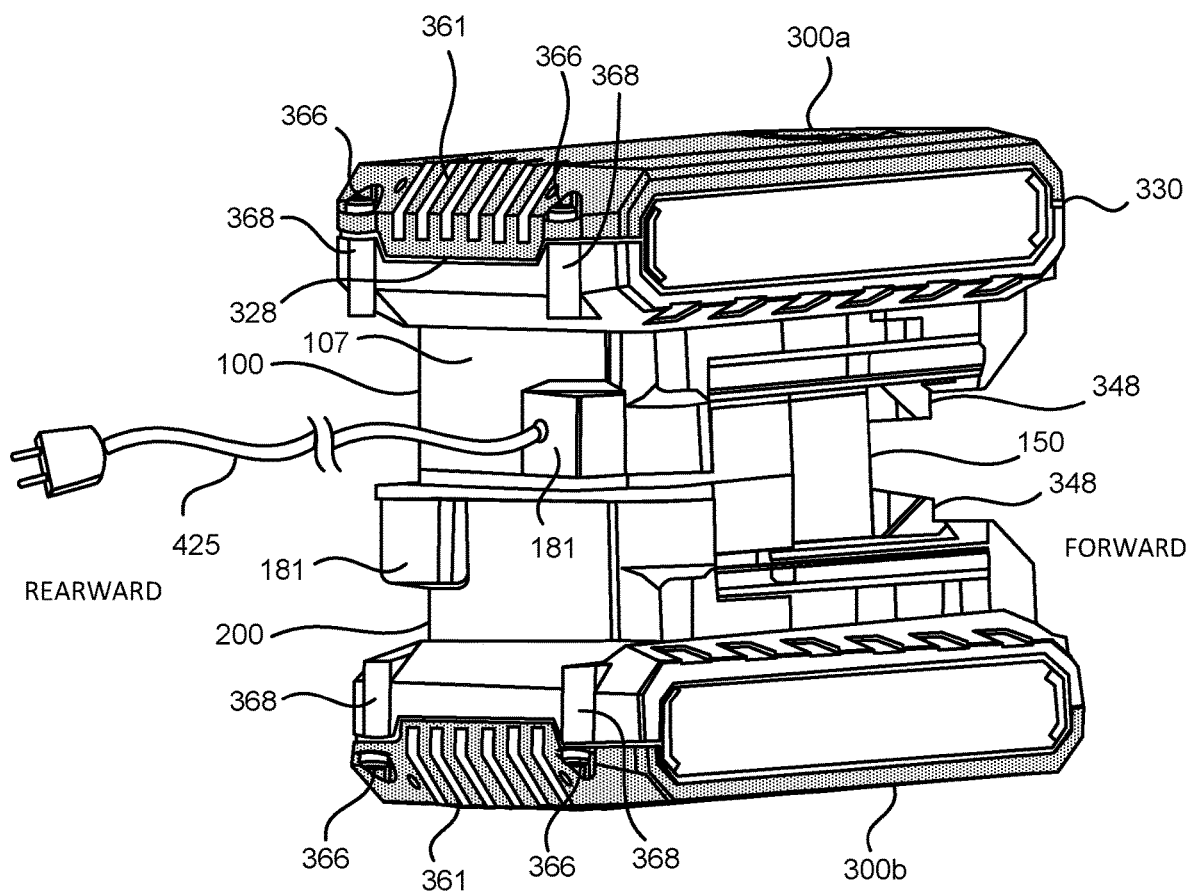
FIG. 3 is a different perspective view of the battery pack charger system of FIG. 1.

Referring to FIG. 2, the battery packs 300a, 300b include a housing assembly 310 to substantially enclose a plurality of battery cells (not shown). The housing assembly 310 may include a top housing 320 and a bottom housing 322. In some implementations, the top and bottom housings 320, 322 may be molded and/or otherwise formed from a polymeric material, for example. In some implementations, the top and bottom housings 320, 322 may be joined together by a snap-fit, press-fit, one or more fasteners and/or any other suitable joining method. For example, as shown in FIG. 3, the top and bottom housings 320, 322 may be attached via a plurality of screws 366 inserted into corresponding screw bosses 368. The top and bottom housings 320, 322 may cooperate to substantially enclose the plurality of battery cells and other components (e.g., a cradle, a circuit board(s), etc.) inside of the battery packs 300a, 300b.

Figure 4:
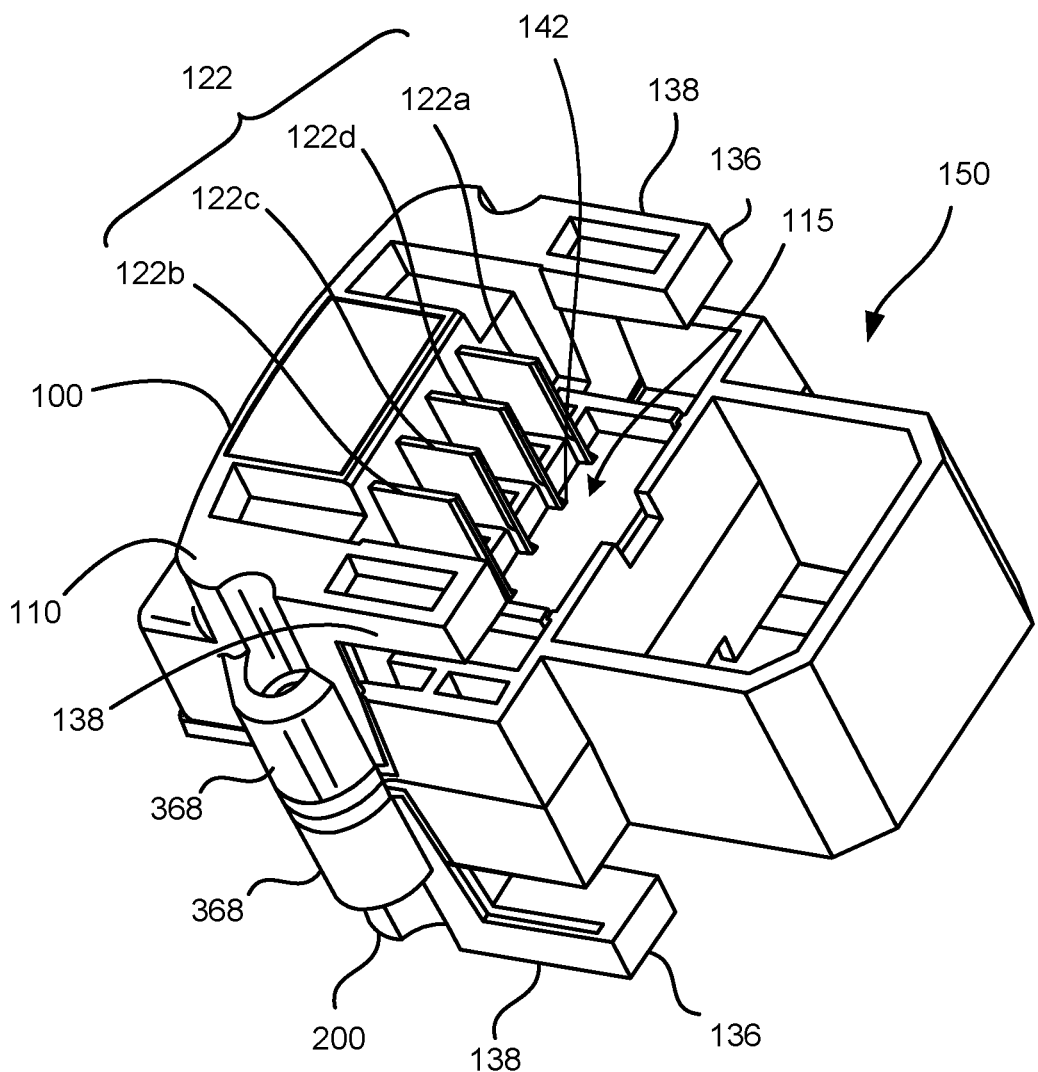
FIG. 4 is a perspective view of an exemplary embodiment of a battery pack charger of the battery pack charger system of FIG. 1.

The top housing 320 may include a base portion 324 and an upper portion 326 that slidably engage with the battery charger 100 or 200. The base portion 324 may include a first end (i.e., rearward) 328 and a second end (i.e., forward) 330, and a first guide aperture 332 and a second guide aperture 334 disposed proximate the first end 328. The upper portion 326 may extend from the base portion 324 and may include a first end 336 and a second end 338. The first and second guide apertures 332, 334 may be disposed between the first end 328 of the base portion 324 and the first end 336 of the upper portion 326. The first end 336 of the upper portion 326 may include a plurality of terminal slots 340. A terminal block (not shown) is provided inside of the upper portion 326, for receiving a corresponding plurality of blade terminals 122 (as shown in FIG. 4) of the battery pack charger 100 or 200. The plurality of terminal slots 340 ensure a proper, alignment therein of the plurality of blade terminals 122 of the battery pack charger 100 or 200, and prevent entry of any bent or damaged blade terminals 122 from engaging the battery pack terminal block.

The upper portion 326 may also include a first pair of guide rails 342 and a second pair of guide rails 344 to correspondingly engage with guide rails of the battery charger 100 or 200, and may slidably engage the first and second pairs of guide rails 342, 344 to attach the battery pack 300a or 300b to the battery charger 100 or 200. In some implementations, leading ends of the first and second pairs of guide rails 342, 344 may be chamfered or beveled to allow for easier alignment and interconnection between the charger 100 or 200 and/or the battery pack 300a or 300b.

The second end 338 of the upper portion 326 may be generally aligned with the second end 330 of the base portion 324 and may include an opening 346 through which a latch 348 extends. The latch 348 may be a part of a release mechanism for releasing the battery pack 300a or 300b from engagement with the battery charger 100 or 200.

The base portion 324 may include a first guide member 354 and a second guide member 356. The first and second guide members 354, 356 may protrude through the guide apertures 332, 334 of the top housing 320 and extend upward from a surface of base portion 324 when the battery pack 300a or 300b is in a fully assembled state. The first and second guide members 354, 356 may be provided to restrict or prevent the battery pack 300a, 300b from being engaged with a charger that is incompatible with the battery pack 300a, 300b. That is, a charger that is intended to operate with a battery pack of a different voltage, type and/or configuration may include structure that would interfere with the first and second guide members 354, 356 to prevent engagement therewith. It will be appreciated from the present disclosure that the first and second guide members 354, 356 could include any suitable shape and/or configuration.

In some implementations, leading ends of the first and second guide members 354, 356 may be chamfered or beveled to allow for easier alignment and interconnection between the battery charger 100 or 200 and/or the battery pack 300a or 300b.

Referring to FIG. 3, a bottom surface (at the first end 328) of the bottom housing 322 may include vent openings 361 to remove heat contained in the battery pack 300a, 300b. In some implementations, the vent openings 361 may also be formed in the bottom surface at the second end 330 of the bottom housing 322.

At a same side of the first end 328 of battery pack 300a, an electrical cord 425 may be attached to a rearward side 107 of the first charger 100 to provide AC electricity (for example, 120 V) to the battery charger 100 and/or battery charger 200. In some implementations, the rearward side 107 of the first charger 100 may include an extension part 181 such that the electrical cord 425 may extend out therefrom. The extension part 181 supports the electrical cord 425 and serves to prevent the electrical cord 425 from separating out from the first charger 100.

In some implementations, the electrical cord 425 may be provided on the second charger 200 (instead of on the first charger 100). In other words, there is only one electrical cord provided in the battery pack charger system 10. Even though only one electrical cord 425 may be provided, power is delivered to the first charger 100 and/or the second charger 100, as required. Hence, only a single electrical outlet is required to deliver power to both the first charger 100 and/or second charger 200. This ensures that less equipment is needed to carry around the battery pack charger system 10, saves storage space, and/or provides a compact design.

FIG. 4 is a perspective view of the chargers 100 and 200 of the battery pack charger system 10 of FIG. 1. It should be appreciated that the chargers 100 and 200 of the battery pack charger system 10 are the same (or substantially identical) and therefore, the description of the components and/or elements of the first charger 100 may be used to describe the second charger 200, and vice versa.

Referring to FIG. 4, the charger 100 includes a housing 110 having a charging port 115 for receiving and charging the battery pack 300a or 300b. The housing 110 may be generally composed of plastic material, such as, for example polyethylene, polypropylene, and/or polyurethane, and may enclose components of the battery charger 100 or 200. In some implementations, the housing 110 may house at least a charging circuit 132 (or 232) (shown in FIG. 5) and a plurality of terminal blades 122.

The housing 110 may include a plurality of openings 142 through which the plurality of terminal blades 122 extend from within the housing 110. The plurality of openings 142 should have substantially identical shape as the plurality of terminal blades 122. The plurality of terminal blades 122 may be electrically coupled to the charging circuit 132 or 232 to charge the battery pack 300a or 300b when the battery pack 300a or 300b is connected to the charging port 115. The plurality of terminal blades 122 can also communicate with the battery pack 300a, 300b to determine at least one of the following functions, such as, for example, detection of the battery packs 300a, 300b, voltage of the battery packs 300a, 300b, temperature of the battery packs 300a, 300b, and/or if the battery packs 300a, 300b is/are experiencing a fault. In some implementations, two of the blade terminals may be used as positive and negative charging terminals, one blade terminal may be used for data (low current or low voltage), and one blade terminal may be used for battery pack identification. For example, terminal blade 122a may be a positive power terminal (CH+), terminal blade 122b may be a negative power terminal (CH−), terminal blade 122c may be used to monitor current, voltage, and/or temperature of the battery cells and/or the battery packs 300*a* or 300*b*, and terminal blade 122*d* may be used to identify faults or errors in battery packs 300*a* or 300*b*.

In some implementations, besides having four terminal blades, there may be more or fewer terminal blades while communicating the same operations and/or functions. For example, instead of the four terminal blade arrangement, the housing 110 may house two terminal blades up to six terminal blades.

The housing 110 may include a connecting structure 136 to engage with the battery pack 300*a* or 300*b*. In some implementations, the connection structure 136 may be two spaced apart, parallel guide rails 138. The guide rails 138 may be integrally molded with the housing 110 and may be configured to receive the corresponding first and second pairs of guide rails 342, 344 of the battery pack 300*a* or 300*b*. For example,a the guide rails 138 may slide to the outside of the first and second pairs of guide rails 342, 344. In other words, the first and second pairs of guide rails 342, 344 on the battery pack 300*a* or 300*b* creates slots to receive the guide rails 138 of the housing 110. The slots may be typically defined by the respective rails. Furthermore, the guide rails 138 may also initially be configured to receive the corresponding first and second guide members 354, 356 on the base portion 324 of the battery pack 300*a* or 30*b*. In other words, the battery pack 300*a* or 300*b* is inserted into the charging port 115 in two stages. In a first stage, the guide rails 138 loosely receive the first and second guide members 354, 356 of the battery pack 300*a* or 300*b*. This avoids a battery pack having a different connection structure from engaging with the guide rails 138. In a second stage, which occurs during approximately the latter portion of travel of the battery pack 300*a* or 300*b* relative to the charger housing 110, the guide rails 138 receive the first and second pairs of guide rails 342, 344 of the battery pack 300*a* or 300*b*. This permits the housing 110 and the battery pack 300*a* or 300*b* to be in a tight fit. In addition, this engagement precisely aligns the plurality of terminal blades 122 with the corresponding plurality of terminal slots 340 of the battery pack 300*a* or 300*b*.

Figure 5:
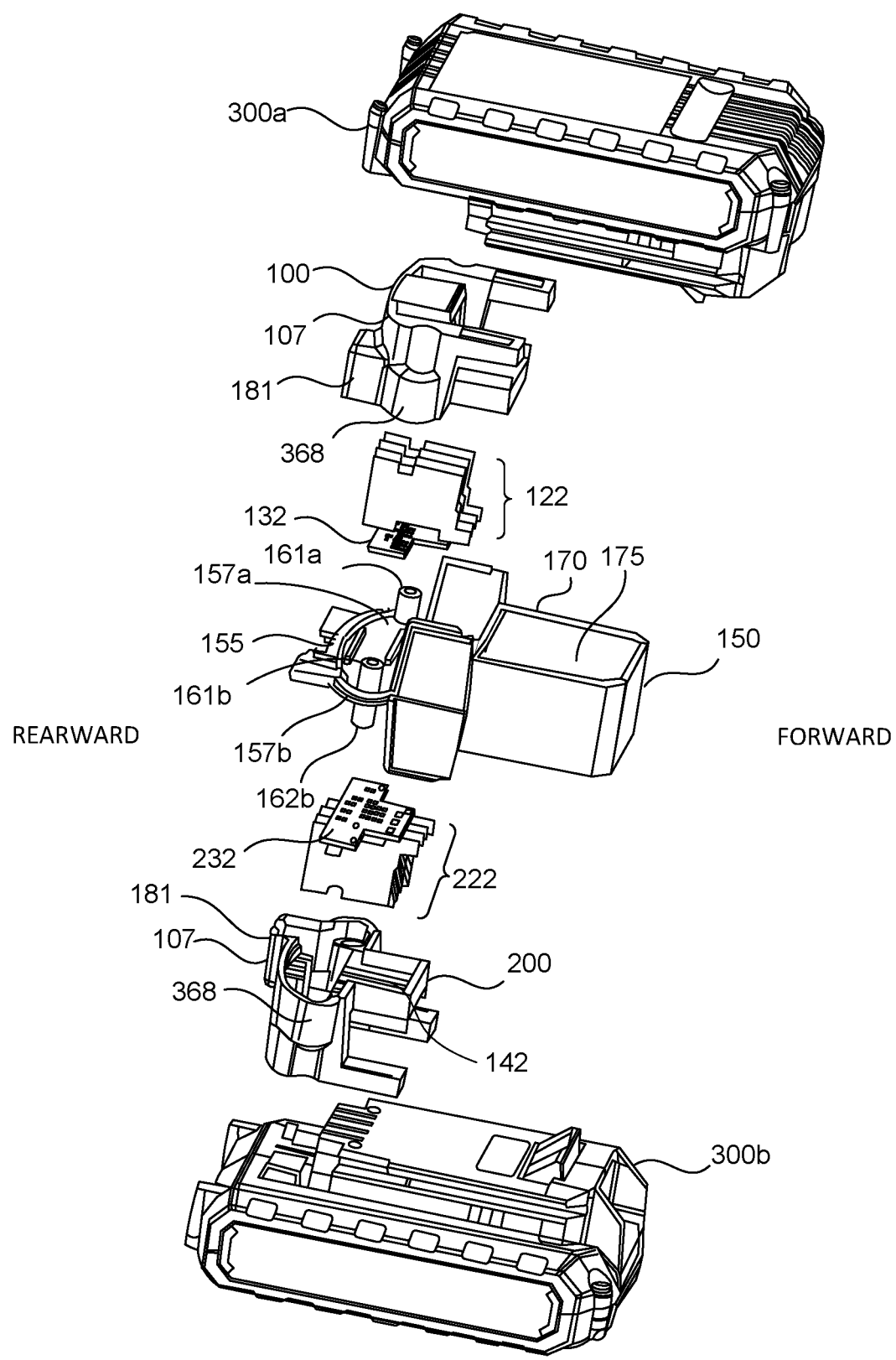
FIG. 5 is an exploded view of the battery pack charger system of FIG. 1.

FIG. 5 is an exploded view of the battery pack charger system 10 of FIG. 1. Referring to FIG. 5, the first charger 100 and the second charger 200 are arranged directly opposite of each other (i.e., back-to-back). Because the first charger 100 and the second charger 200 are arranged in this manner, the first and second battery packs 300*a*, 300*b* are also arranged opposing each other (i.e., face-to-face). The support 150 may be arranged between the first charger 100 and the second charger 200 to separate both of the chargers 100, 200 and/or the battery packs 300*a*, 300*b*.

A size/dimension of the support 150 should be sufficient to separate the first battery pack 300*a* and the second battery pack 300*b* supported by at least the respective upper portions 326 of the battery packs 300*a*, 300*b* and ensure that the first and second battery packs 300*a*, 300*b* do not interfere with each other during the charging stage.

In some implementations, a battery pack (300*a* or 300*b*) having a single string of 5 cells may have an overall length of approximately 11.5 cm, an overall width of approximately 7.8 cm, and an overall height of approximately 4.5 cm. In some implementations, a battery pack having two strings of 5 cells, wherein the two strings may be connected in parallel or series (not shown), may have an overall length of approximately 11.5 cm, an overall width of approximately 7.8 cm, and an overall height of approximately 6.5 cm. In some implementations, a battery pack having three strings of 5 cells, wherein the three strings may be connected in parallel or series (not shown), may have an overall length of approximately 11.5 cm, an overall width of approximately 7.8 cm, and an overall height of approximately 8.5 cm.

In some implementations, the overall height of the support 150 should be sufficient so that the two battery packs 300*a* and 300*b* do not interfere (or contact) each other during charging. For example, the support 150 may have an overall length of approximately 9.6 cm, an overall width of approximately 7.2 cm, and an overall height of approximately 2.6 cm. It should appreciated that other size/dimensions of the battery pack(s) may be implemented, depending on the desired voltage ratings, capacity ratings, number of cell, etc.

Figure 6A:
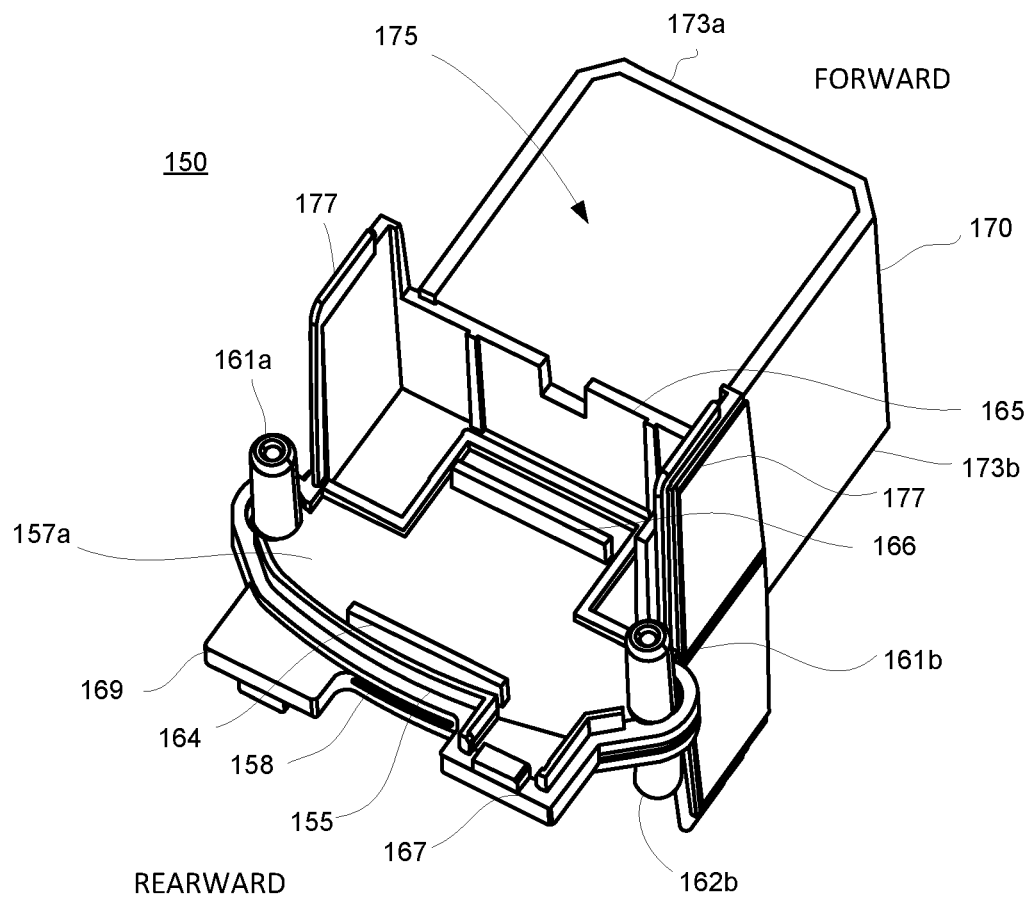
FIG. 6A is a perspective view of an exemplary embodiment of a support of the battery pack charger system of FIG. 1.

Referring to FIG. 6A, the support 150 may include a platform 155 and a projecting part 170. In an exemplary embodiment as illustrated, the platform 155 may have a substantially semi-circular shape at a rearward side 158 of the platform 155. It should be appreciated that other shapes of the rearward side 158 of the platform 155 may be employed. For example, the rearward side 158 may be substantially linear (i.e., straight). The shape of the rearward side 158 of the platform 155 should correspond to a shape of the rearward side 107 (shown in FIG. 5) of the first and second chargers 100, 200.

A first extension part 167 is on one side of the rearward side 158 of the platform 155 so that the power cord 425 may extend out from the housing 110 of the charger 100 (or 200). The first extension part 167 may also be used as a support to prevent the power cord 425 from twisting which may cause possible power shortages. Similarly, the rearward side 107 of the housing 110 of the charger 100 (or 200) should include the extension part 181 (shown in FIG. 5) to correspond to the same shape of the rearward side 158 of the support 150 when connected to the structure. At the other side of the rearward side 158 of the platform 155 is a second extension part 169. The second extension part 169 may be utilized by a user to facilitate holding the support 150. The second extension part 169 may also provide a stronger support structure (i.e., reduce/distribute stress loads, tension, compression, etc.). In some implementations, the shape and size of the second extension part 169 may match the shape and size of the first extension part 167. For example, the first and second extension parts 167, 169 may be a substantially rectangular in shape.

The platform 155 may be used to connect the first charger 100 on one (first) side 157*a* and the second charger 200 on the other (second) side 157*b*. In one implementation, the charging circuit 132 containing the plurality of terminal blades 122 of the first charger 100 may be attached to the first side 157*a* of the platform 155, and a charging circuit 232 containing a plurality of terminal blades 222 of the second charger 200 may be attached to the second side 157*b* of the platform 155. In order to secure attachment of the charging circuit 132 to the first side 157*a* of the platform 155, a first bracket 164 may be formed on the platform 155. The first bracket 164, near the rearward side 158 of the platform, may extend upwardly from a surface of the first side 157*a* of the platform 155. Near a forward side 165 of the platform 155, a second bracket 166 may extend upwardly from the surface of the first side 157*a* of the platform 155. The first and second brackets 164, 166 may be integrally molded with the first side 157*a* of the platform 155. The first and second brackets 164, 166 prevent movement of the charging circuit 132 and/or hold the charging circuit 132 securely in place when the plurality of terminal blades 122 engage the corresponding terminals of the terminal block of the battery pack 300*a*. In some implementations, the first and second brackets 164, 166 may be substantially parallel with respect to each other. In some implementations, additional bracket(s) may be formed on the first side 157a of the platform 155 to securely hold the charging circuit 132 and the terminal blades 122. For example, there may be (smaller) bracket(s) on each side of the first and second brackets 164, 166 in a perpendicular direction thereof. The first and second brackets 164, 166 may be formed on the second side 157b of the platform 155, directly opposite to the first and second brackets 164, 166 of the first side 157a, in a similar manner.

The platform 155 may further include two spaced apart pedestals 161a, 161b on the first side 157a of the platform 155 and two spaced apart pedestals 162a, 162b on the second side 157b of the platform 155. The pedestals 161a, 161b may be integrally molded with the first side 157a of the platform 155, and the pedestals 162a, 162b may be integrally molded with the second side 157b of the platform 155. The pedestals 161a, 161b may be configured to align the first charger 100, and the pedestals 162a, 162b may be configured to align the second charger 200. In one implementation, the pedestals 161a, 161b may be inserted into the corresponding screw boss 368 of the first charger 100. Once the first charger 100 engages with the platform 155, screws 366 may be used to tightly secure the first charger 100 to the platform 155 of the support 150. The second charger 200 may be similarly engaged with the platform 155 of the support—yet on the second side 157b of the platform 155.

The platform 155 may include a pair of sidewalls 177 to protect the first and second chargers 100, 200. Specifically, the pair of sidewalls 177 may protect the plurality of terminal blades 122 from damage. The height of the sidewalls 177 should be sufficient to cover (extend over) the plurality of terminal blades 122, but not to extend or hinder the connection of the battery packs 300a, 300b to their respective battery chargers 100, 200.

The projecting part 170 may extend away from the platform 155 and may be integrally molded with the platform 155. In one implementation, the projecting part 170 may extend in a direction of the battery packs 300a or 300b in a longitudinal direction. The projecting part 170 should have a length in the longitudinal direction sufficient to support the battery packs 300a, 300b on each side thereof. For example, one side (first) 173a of the projecting part 170 may support and/or contact the upper portion 326 of the first battery pack 330a and the other side (second) 173b of the projecting part 170 may support and/or contact the upper portion 326 of the second battery pack 330b. Further, the projecting part 170 should have sufficient height so that the battery packs 300a and 300b do not interfere (i.e., contact) with each other during the charging stage. In an exemplary embodiment as illustrated, the projecting part 170 may have an overall dimension of approximately 4.9 cm in length, approximately 4.0 cm in width, and approximately 2.6 cm in height.

Figure 6B:
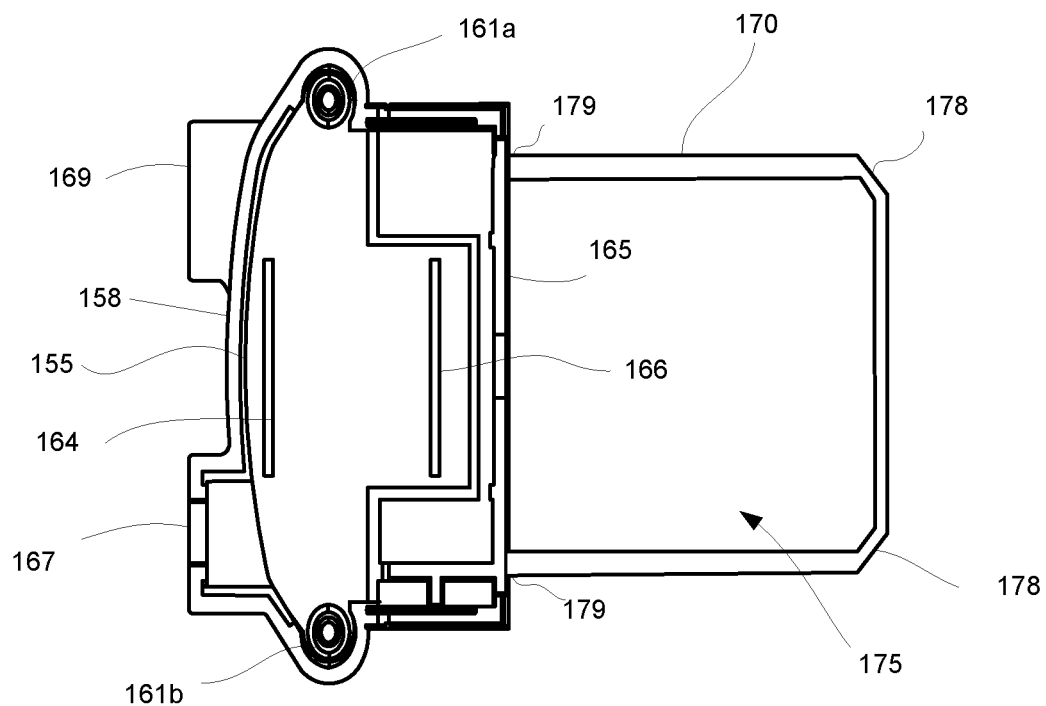
FIG. 6B is a top view of the support of FIG. 6A.

Referring to FIG. 6B, the projecting part 170 may have end portions 179 which may be attached to a surface of the forward side 165 of the platform 155. In an exemplary embodiment as illustrated, the end portions 179 attached to the forward side 165 of the platform 155 create an inverse C-shape (when viewed from a top view). It should be appreciated that the platform 155 may be created in other shapes. The projecting part 170 may include an opening 175 to facilitate transfer of heat trapped in the battery pack charging system 10. In addition, the opening 175 reduces cost of material and/or overall weight of the support 150. Ends 178 of the projection part 170 may be chamfered or beveled to avoid straight edges (e.g., 90 degree edges) which may damage the battery packs 300a, 300b.

Figure 6C:
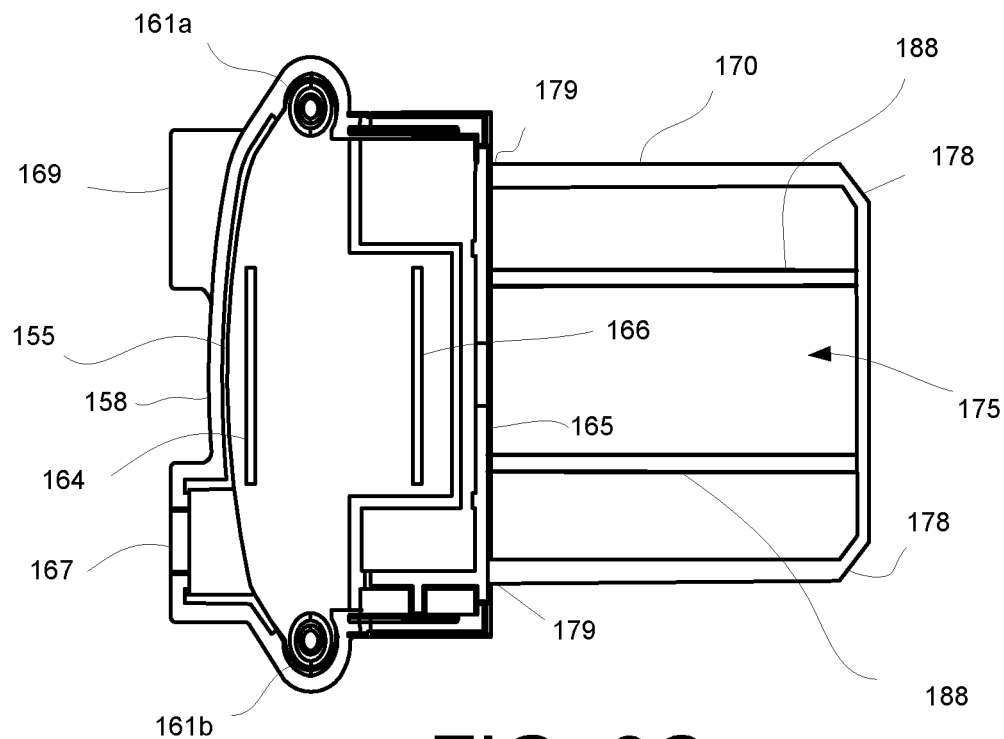
FIG. 6C is a top view of another exemplary embodiment of a support of the battery pack charger system of FIG. 1.

FIG. 6C is a top view of the support 150 including the platform 155 and the projection part 170 in accordance with another example embodiment. The support 150 of FIG. 6C is similar to the support 150 of FIG. 6B except that the opening 175 of the projection part 170 includes reinforcing members 188. The reinforcing members 188 may produce a stronger support structure to the projecting part 170. The reinforcing members 188 may be integrally molded with the projecting part 170 and/or to the platform 155.

In some implementations, the reinforcing members 188 may be several members within the opening 175 of the projecting part 170. In an exemplary embodiment as illustrated, two horizontal reinforcing members may be within the opening 175 of the projecting part 170. The horizontal reinforcing members may be evenly spaced within the opening 175. In another example embodiment, a vertical reinforcing member(s) may be formed within the opening 175 of the projecting part 170.

Figure 7:
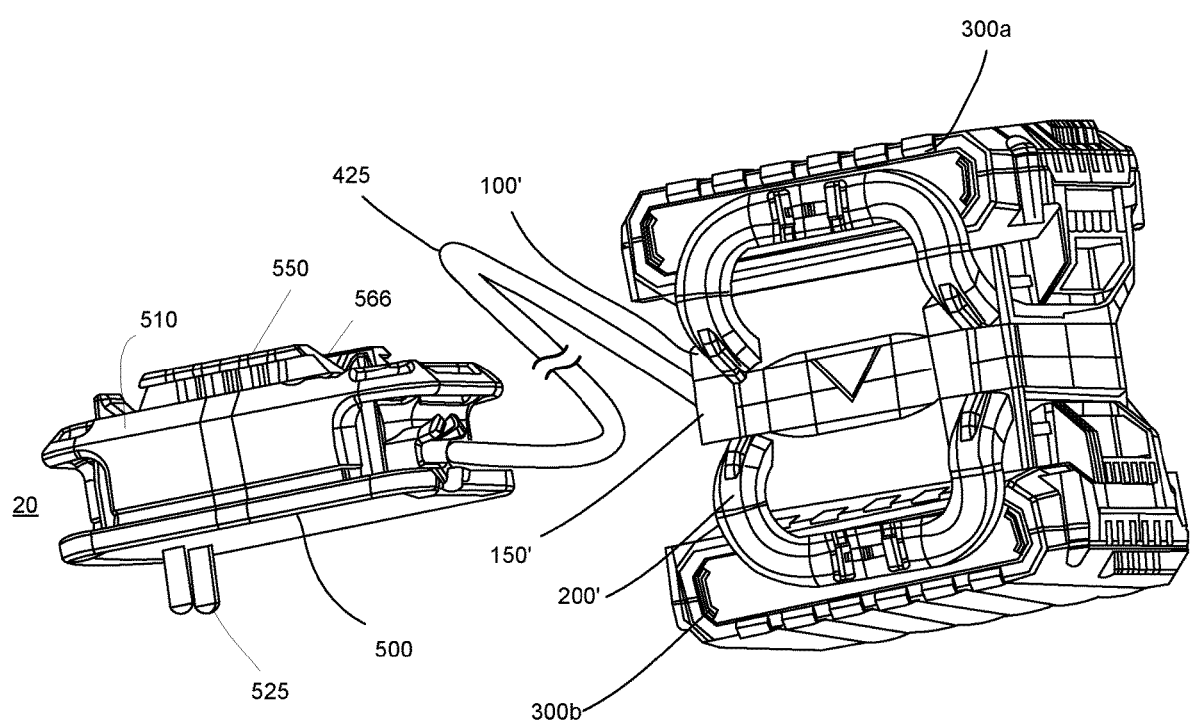
FIG. 7 is a perspective view of a battery pack charger system in accordance to another example embodiment.

FIG. 7 is a perspective view of a battery pack charger system 20 in accordance to another example embodiment. Referring to FIG. 7, the battery pack charger system 20 may include a first charger 100' for charging the first battery pack 300a, a second charger 200' for charging the second battery pack 300b, a support 150' arranged between the first charger 100' and the second charger 200', and a battery power brick 500. It should be appreciated that the battery packs 300a, 300b are identical to the battery packs as described in FIG. 1; however the first charger 100', the second charger 200' and the support 150' of FIG. 7 are not the same respective elements as described in FIG. 1, and will be discussed further in detail . Further, it should also be appreciated that functions and/or operations of the first and second chargers 100', 200', the first and second battery packs 300a, 300b, and the support 150' are similar to the example embodiment of FIG. 1, and will not be discussed in detail in this section.

The power brick 500 may facilitate portability of charging the battery packs 300a, 300b without added internal power components (e.g., transformer, rectifier, filter, regulator circuits, etc.) located in the battery packs 300a, 300b and/or chargers 100' or 200', and makes it unnecessary to include additional component(s) for use with a specified power source (i.e., the battery packs and/or chargers can be powered from the same power source, for example, 120 V). Hence, removing the added internal power component(s) may reduce weight and size which must be carried by the battery packs 300a, 300b and/or chargers 100', 200'. Additionally, the presence of the power brick 500 may reduce heat generated within the battery packs 300a, 300b and/or chargers 100', 200'.

The power brick 500 may include an electrical outlet plug 525 to be plugged into an AC wall outlet to receive power. In some implementations, the electrical outlet plug 525 may be within (i.e., built-in) the power brick 500. For example, the electrical outlet plug 525 is part of the power brick 500 and extends directly out from the power brick 500. The power brick 500 may be connected to the first charger 100' and/or the second charger 200' via the electrical cord 425. When the power brick 500 is plugged into the AC wall outlet, the power brick 500 delivers power to the first charger 100' and/or the second charger 200' and charges the respective battery packs 300a, 300b.

Figure 8A:
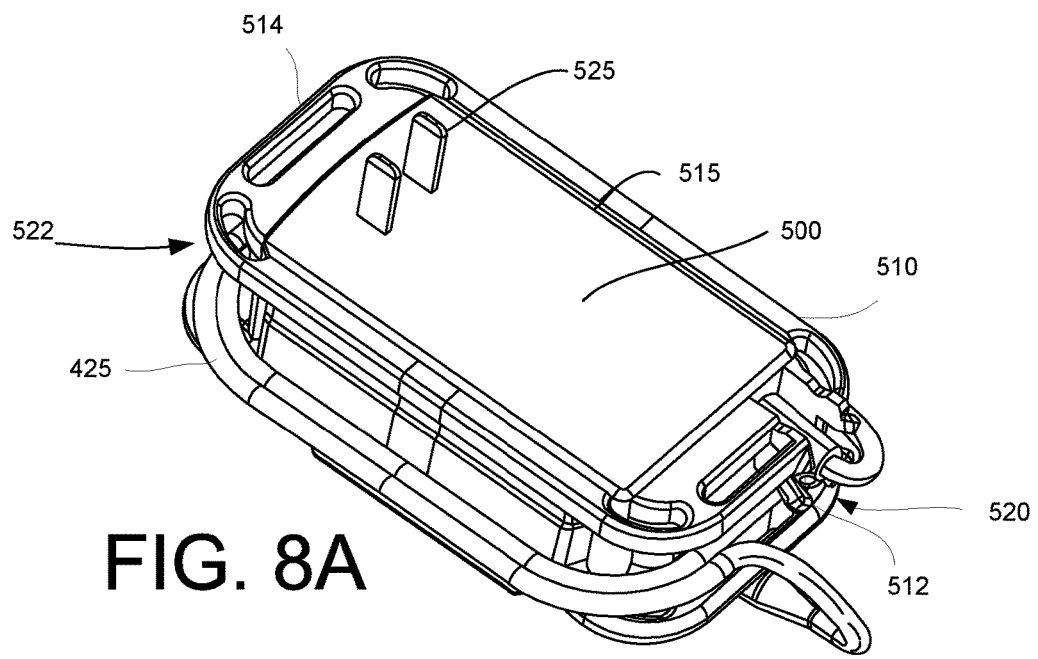
FIGS. 8A and 8B are perspective views of a battery power brick of the battery pack charger system of FIG. 7.
Figure 8B:
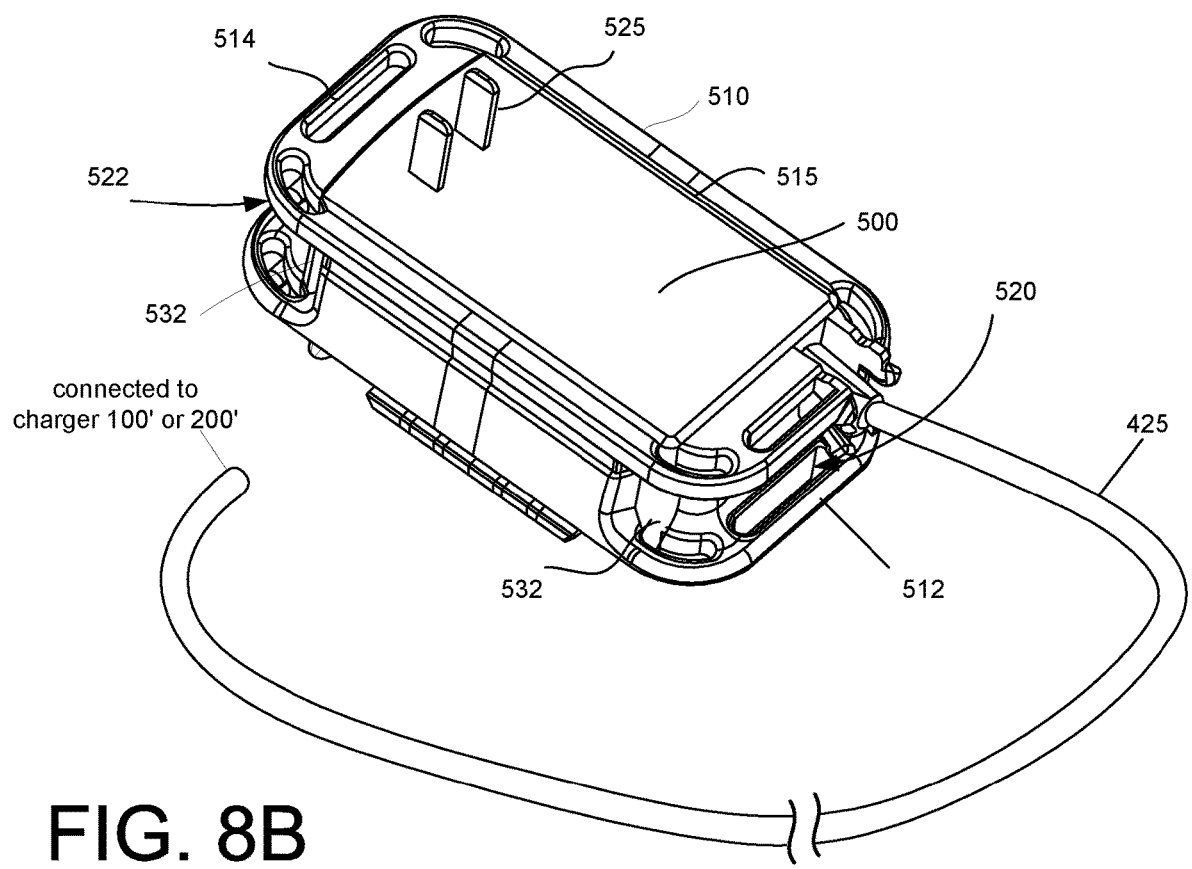

Referring to FIGS. 8A and 8B, the power brick 500 may be enclosed within a casing 510 to protect external and/or internal components of the power brick 500. In some implementations, the casing 510 may be substantially rectangular in shape. In some implementations, the casing 510 may be another shape as long as the casing 510 corresponds to the shape of the power brick 500. The casing 510 may include a first end 512 and a second end 514. Each of the first and second ends 512, 514 of the casing 510, may include recesses 520, 522, respectively, configured to enable wrapping the electrical cord 425 within the recesses 520, 522.

Near each corner of the casing 510 there may be included a rod 532 (within the recesses 520, 522) to facilitate wrapping the electrical cord 425 around the power brick 500 (as shown in FIG. 8A). The rods 532 further enable the electrical cord 425 to be wrapped in a tight manner (i.e., wrapping the electrical cord 425 around the casing 510 in a bottom to top arrangement).

Referring back to FIG. 7, the casing 510 of the power brick 500 may include a pair of guide rails 550 to correspondingly receive the first charger 100' (when the first battery pack 300a is removed from the first charger 100'). Leading ends 566 of the pair of guide rails 550 may be chamfered or beveled to allow for easier alignment and interconnection between the casing 510 of the power brick 500 and the first charger 100'.

Figure 10:
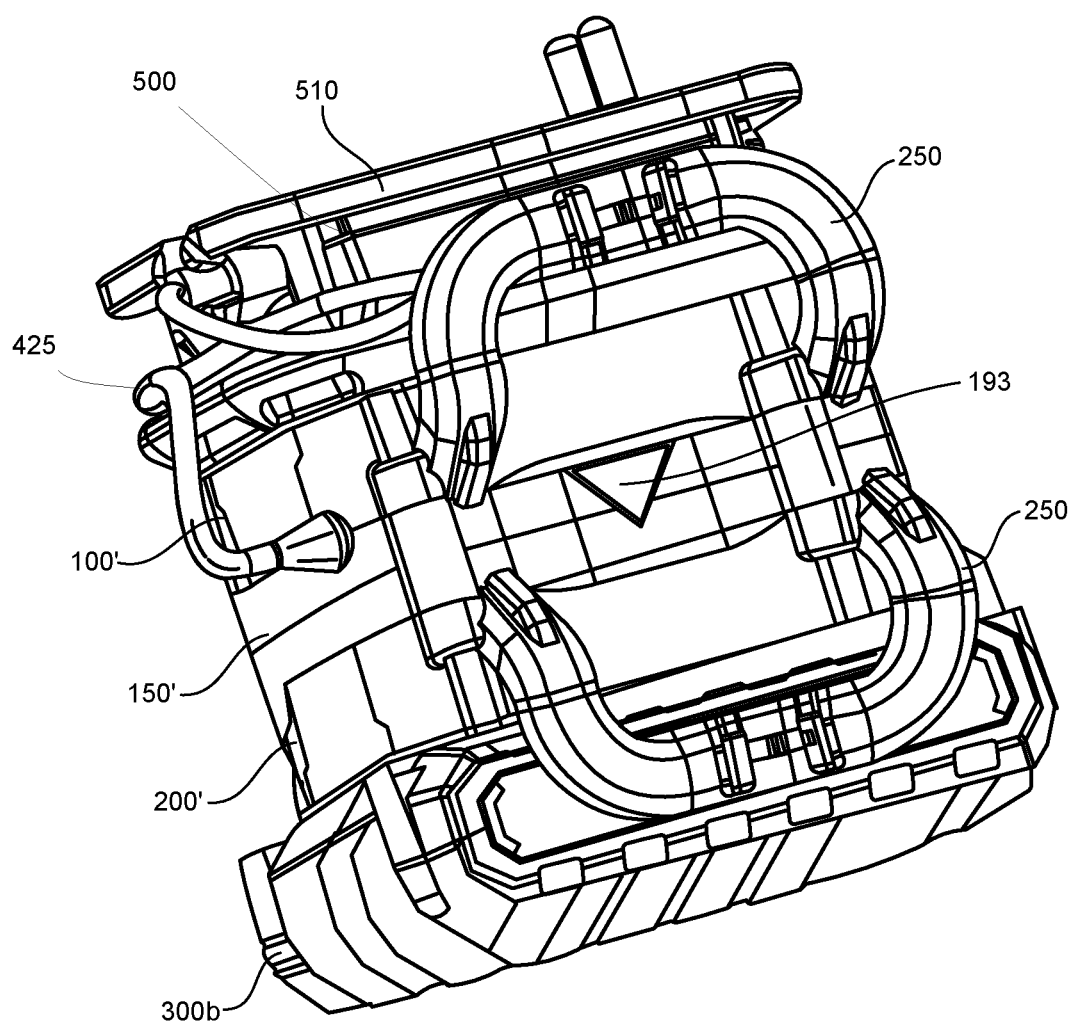
FIG. 10 is a perspective view of a battery pack charger system in accordance to another example embodiment.

In some implementations, the pair of guide rails 550 may be located at the opposite side with respect to the outlet plug 525 of the power brick 500. Hence, the casing 510 may include an opening 515 opposite the side of the pair of guide rails 550 to expose the electrical outlet plug 525. This permits the casing 510 of the power brick 500 to be attached with the first battery charger 100' (as shown in FIG. 10), and provide electrical power while the power brick 500 is plugged into the AC wall outlet. While the user operates the cordless device powered by the first battery pack 300a, the second battery pack 300b is still being charged via the power brick 500, thus saving charging time, and due to its compact configuration, saving space.

Figure 9:
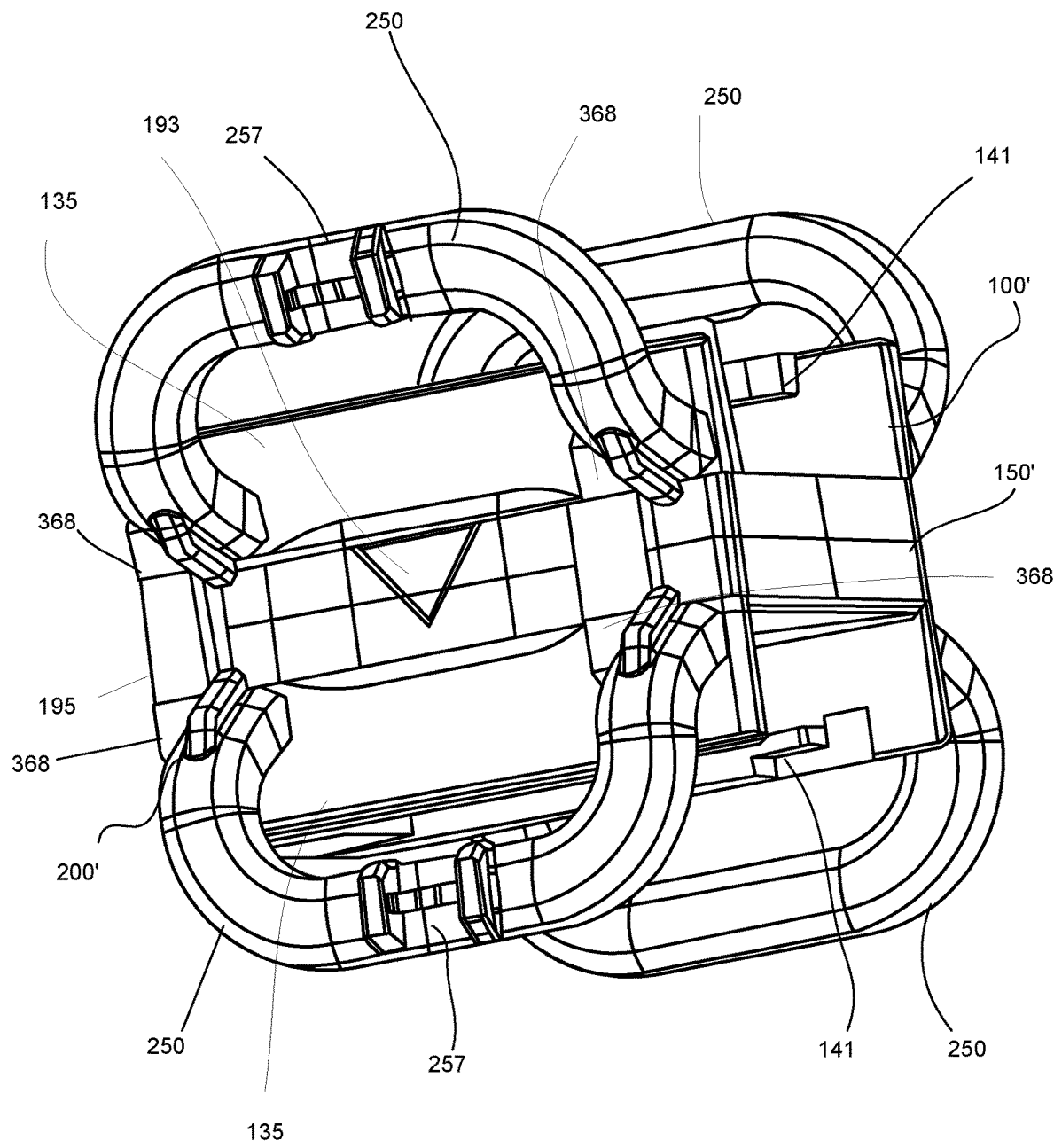
FIG. 9 is a perspective view of a battery pack charger of the battery pack charger system of FIG. 7.

FIG. 9 is a perspective view of the chargers 100' and 200' of the battery pack charger system 20 of FIG. 7. It should be appreciated that the chargers 100' and 200' of battery pack charger system 20 are the same (or substantially identical) and therefore, the description of the components and/or elements of the first charger 100' may be used to describe the second charger 200', and vice versa.

Referring to FIG. 9, each of the chargers 100', 200' includes a housing 135 for receiving the battery pack 300a, 300b and/or the casing 510 of the power brick 500, and a pair of reinforcing members 250. The housing 135 and the pair of reinforcing members 250 may be generally composed of plastic material, such as, for example polyethylene, polypropylene, and/or polyurethane, and may be molded together.

Each inside (longitudinal) sidewall of the housing 135 includes a guide rail 141. The guide rails 141 may be integrally molded with the housing 135 and may be configured to receive the corresponding first and second pairs of guide rails 342, 344 of the battery pack 300a or 300b, and/or the pair of guide rails 550 of the casing 510 of the power brick 500.

The pair of reinforcing members 250 may be attached at an outside (longitudinal) sidewall of the housing 135. In some implementations, the pair of reinforcing members 250 extends outwardly from the outside sidewall of the housing 135. The pair of reinforcing members 250 may provide structural support for the housing 135. In addition, the pair of reinforcing members 250 may protect the battery packs 300a, 300b, and/or the power brick 500. More specifically, the configuration of the pair of reinforcing members 250 extending out from the housing 135 protects the battery packs 300a, 300b, and/or the power brick 500 from damages (i.e., drops, impacts, force, etc.), and hence, provides for a tougher, more protective case. In particular, the pair of reinforcing members 250 may protect a portion of the battery packs 300a, 300b and/or the power brick 500 at or near the sidewalls.

At a central portion of each of the reinforcing members 250 includes a securing rib 257 for securing the electrical cord 425. The securing rib 257 may be integrally molded in the reinforcing member 250 forming a slot to secure the electrical cord 425 against the reinforcement member 250. For example, when the power brick 500 is disengaged from the first charger 100' (or the second charger 200'), the electrical cord 425 may be wrapped around the reinforcing members 250 and snapped into the securing rib 257 to hold the electrical cord 425 in place. In other words, the securing rib 257 allows the electrical cord 425 to be secured and prevents the electrical cord 425 from unraveling after the electrical cord 425 is wrapped around the reinforcement members 250.

Figure 11:
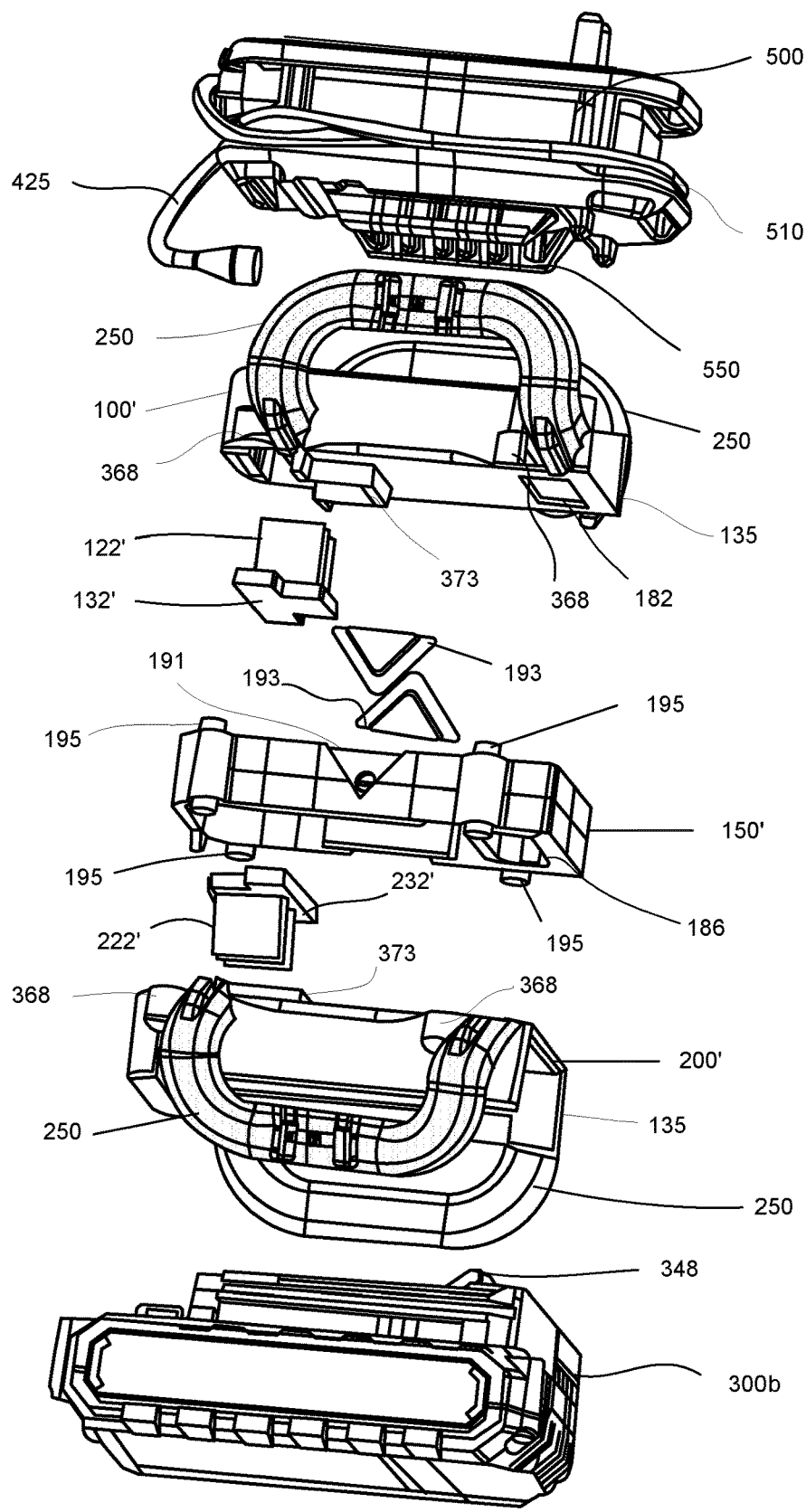
FIG. 11 is an exploded view of the battery pack charger system of FIG. 10.

Referring to FIG. 11, the housing 135 may house at least the charging circuit 132' (or 232') and the plurality of terminal blades 122' (or 222'). The housing 135 may further include an opening 373 at a bottom surface of the housing 135 to insert the plurality of terminal blades 122' (or 222') through the opening 373. In some implementations, the opening 373 may be substantially rectangular in shape. A portion of the charging circuit 132' (or 232') including the plurality of terminal blades 122' (or 222') may be inserted into the opening 373 to provide a charging port when the battery pack 300a or 300b is engaged to the housing 100' or 200'.

The chargers 100' and 200' are connected to the support 150'. In some implementations, the chargers 100' and 200' may be connected to the support 150' by one or more fasteners. For example, the chargers 100' and 200' may be attached via a plurality of screws (not shown) inserted into corresponding screw bosses 368 near each corner of the support 150'. The screw bosses 368 of the chargers 100' and 200' may cooperate with corresponding screw bosses 195 in the support 150'.

The first charger 100' and the second charger 200' may be arranged directly opposite of each other (i.e., back-to-back). Because the first charger 100' and the second charger 200' are arranged in this manner, the first and second battery packs 300a, 300b are also arranged directly opposite of each other (i.e., face-to-face). The support 150' may be arranged between the first charger 100' and the second charger 200' to separate the battery packs 300a, 300b (and/or the power brick 500). The support 150' should have a dimension/size to separate the first battery pack 300a and the second battery pack 300b (and/or the power brick 500) from contacting each other (i.e., interfering during the charging stage).

Figure 12A:
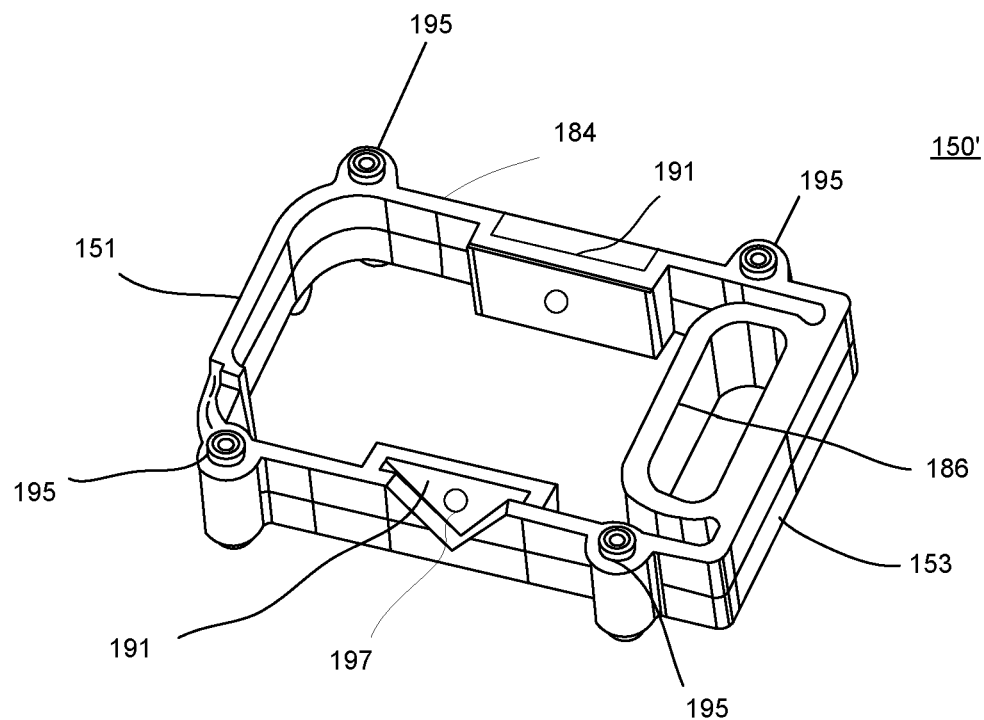
FIGS. 12A and 12B are perspective views of an exemplary embodiment of a support of the battery pack charger system of FIG. 10.
Figure 12B:
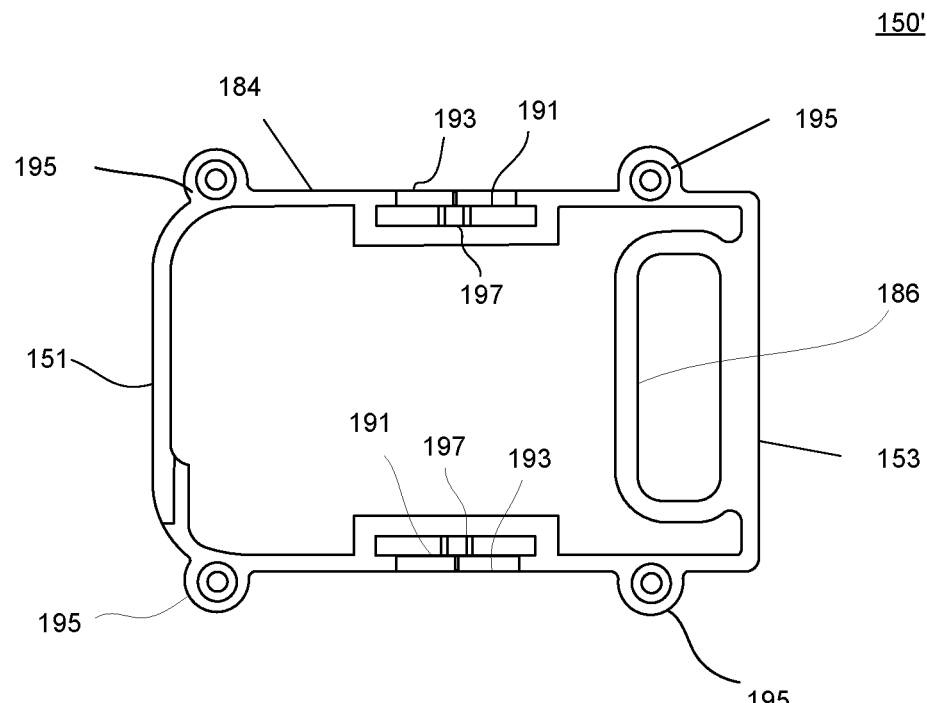

Referring to FIGS. 12A and 12B, the support 150' of the battery pack charger system 20 may include an outer ring portion 184 and an inner ring portion 186. In an exemplary embodiment as illustrated, the outer ring portion 184 may be substantially rectangular in shape, having a first end 151 and a second end 153. It should be appreciated that other shapes of the outer ring portion 184 may be employed. The shape of the outer ring portion 184 should correspond to a shape of the housing 135 of the first and second chargers 100', 200'. The outer ring portion 184 and the inner ring portion 186 may be generally composed of plastic material, such as, for example polyethylene, polypropylene, and/or polyurethane, and may be molded together.

The outer ring portion 184 may include the screw bosses 195 at an outer wall of the outer ring portion 184 to correspond and engage with the screw bosses 368 of the first and second chargers 100', 200' (as shown in FIG. 9), so as to connect the support 150' with the housing 135 of the first and second chargers 100', 200'. In some implementations, the screw bosses 195 may be near the four corners of the outer ring portion 184. The screw bosses 195 may be integrally molded to an outer wall of the outer ring portion 184.

The outer ring portion 184 may include an indicator window 193 (as shown in FIG. 10) at each sidewall of the outer ring portion 184 to display the status of the battery packs 300a, 300b. The indicator window 193 may be inserted into an insertion portion 191 formed in the outer ring portion 184. The insertion portion 191 may be integrally formed along a sidewall of the outer ring portion 184. In some implementations, the indicator window 193 may be triangular in shape which matches the shape of the insertion portion 191. It should be appreciated that other shapes may be employed as long as the insertion portion 191 and the indicator window 193 have the same shape. The insertion portion 191 may include an opening 197 to permit light to pass through and display the status of the battery packs 300a and 300b. In some implementations, the indicator window 193 may indicate a steady-state or a blinking state indicating the status of the battery packs 300a and 300b connected to the respective charging ports. For example, a non-blinking (steady-state) light may indicate that the battery pack 300a or 300b is fully charged, and a blinking light may indicate that the battery pack 300a or 300b is not fully charged but still charging. In some implementations, the indicator window 193 may be colored to indicate the status.

In some implementations, light emitting diodes (LEDs) may be employed that may be electrically coupled to the respective charging circuit 132', 232'. The LEDs may indicate the status of the respective battery packs 300a, 300b and may be displayed through the indicator window 193. In some implementations, there may be two LEDs associated with the respective charging port. For example, one of the LEDs may be one color (e.g., green), while the other LED may be a different color (e.g., red). In some implementations, when charging the battery packs, the LEDs may illuminate to indicate the status of the battery packs 300a, 300b. For example, a continuous red light may indicate that the battery packs 300a, 300b may be charging, a continuous green light may indicate that charging is complete, and blinking red (or green) lights may indicate an error or fault with the battery packs 300a, 300b.

The inner ring portion 186 may be located at the second end 153 of the outer ring portion 184, for example. The inner ring portion 186 creates an opening to allow the latch 348 (as shown in FIG. 10) of the battery pack 300a or 300b to be inserted therethrough and securely hold the battery pack 300a or 300b in the charger 100' or 200'. Similarly, at a corresponding location of the inner ring portion 186, the housing 135 of the first and second chargers 100', 200' may include an opening 182 to allow the latch 348 to extend into the opening 182 and the opening of the inner ring portion 186 to securely hold the battery pack 300a or 300b.

Figure 13:
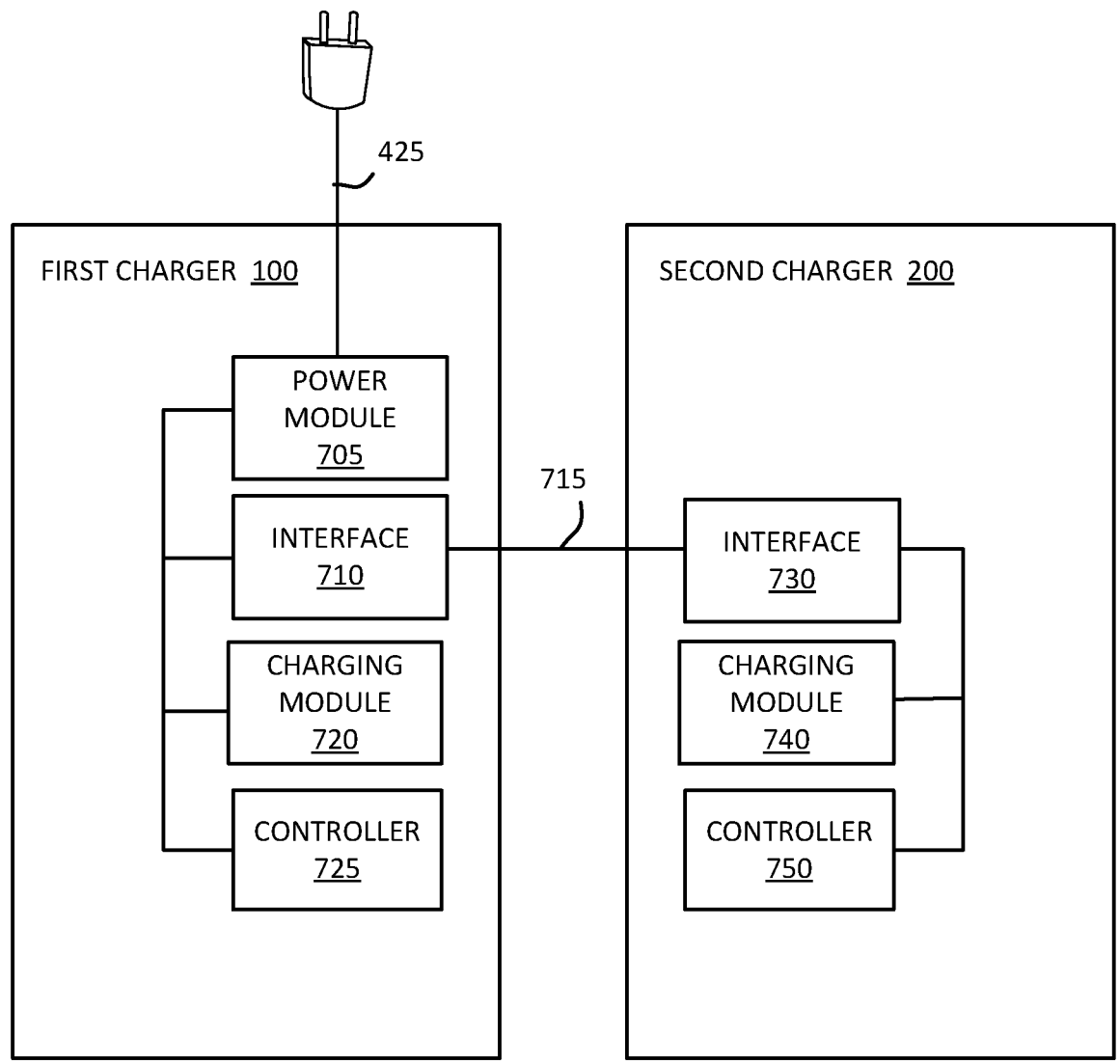
FIG. 13 is a schematic block diagram of a battery pack charger system according to at least one example embodiment.

FIG. 13 is a schematic block diagram of the battery pack charger system 10 according to at least one example embodiment. As shown in FIG. 13, the battery pack charger system 10 may include the first charger 100 and the second charger 200. The first charger 100 and the second charger 200 may be communicatively coupled via a wire 715. The first charger 100 may include a power module 705, an interface 710, a charging module 720, a controller (control circuit) 725, and a power cord 425. The second charger 200 may include an interface 730, a charging module 740, and a controller (control circuit) 750.

In some implementations, the wire 715 may be communicatively coupled to (e.g., between) the interface 710 and the interface 730. In some implementations, the wire 715 may be configured to transfer power from the first charger 100 to the second charger 200 and/or configured to carry communication signals between the first charger 100 and the second charger 200. For example, the communication signals may include information or data associated with powering the chargers 100 or 200, a detection of the battery packs 300a or 300b, a status of the battery pack 300a or 300b and/or battery charge. The data associated with powering the chargers 100 and/or 200 may include an amount of power to power a processor, a memory, and the like. The data associated with detection may include the detection of the battery packs 300a or 300b in the respective chargers 100 or 200, and the like. The status of the battery pack 300a or 300b and/or battery charge may include a battery capacity, a charge amount, a charging power, a voltage, a current, a temperature, a charging status (e.g., full/charging), an error(s) associated with charging the battery pack 300a or 300b and/or the like.

The power module 705 may be configured to convert AC (e.g., 120 V) to DC (e.g., 20 V) and transform a voltage associated with a wall outlet to a voltage associated with a cordless device. Converting AC to DC and transforming the voltage associated with the wall outlet may include use of a transformer. The voltage can be a varying voltage (e.g., between 5V and 20V and the like). The power module 705 may be configured to communicate conditions or status associated with power to the controller 725. For example, the power module 705 may communicate at least one voltage, at least one current and/or at least one power. For example, a voltage associated with the wall outlet, a converted voltage, and/or a current drawn may be communicated. The power module 705 may be configured to transfer DC power to the interface 710. The interface 710 may be configured to couple DC power from the first charger 100 to the interface 730 of the second charger 200 (e.g., via the wire 715).

The interface 730 may be configured to receive communications from the first charger 100 via the wire 715. The interface 730 may be configured to communicate the communications to the controller 750. The interface 730 may be configured to receive DC power from the interface 710 of the first charger 100.

The controller 725 may be configured to receive information or data associated with detection of the first battery pack 300a, receiving power associated with the first charger 100 and a status and/or charge of the first battery pack 300a. The information or data relating to detection can include an identification of battery (i.e., type of battery) and/or detection of battery in the charging port 115 of the first charger 100.

The information or data relating to power can include a desired voltage, current and/or power setting, an over temperature protection threshold, an over voltage protection threshold, an over current protection threshold, a communication time interval and/or the like. The information or data relating to the status and/or charge of the first battery pack 300a charge may include a battery capacity, a charge amount, a charging power, a voltage, a current, a temperature, a charging status (e.g., full/charging), an error(s) associated with charging the first battery pack 300a and/or the like. The controller 725 may be configured to use the desired voltage, current and/or power setting, the over temperature protection threshold, the over voltage protection threshold, the over current protection threshold, the communication time interval and/or the like to modify voltage, current and/or power settings of the first charger 100. The controller 725 may be configured to use the status of and/or charge of the first battery pack 300a to modify voltage, current and/or power settings of the first charger 100 that are associated with the powering the first charger 100 and/or charging the first battery pack 300a.

In some implementations, the controller 725 may be configured to generate signals to protect the first charger 100 should an error (e.g., over current and/or high temperature) be indicated by the status and/or charge of the first battery pack 300a. For example, the controller 725 may be configured to disconnect or cause the first charger 100 to stop (or reduce) transferring DC power should an error condition be indicated by the status and/or charge of the first battery pack 300a. The controller 725 may be configured to disconnect or cause the first charger 100 to stop transferring DC power should a fully charged condition be indicated by the status and/or charge of the first battery pack 300a.

In some implementations, the controller 725 may be configured to receive signals from the power module 705. The signals may indicate at least one of a power, a voltage and a current associated with the power module 705 (and, therefore, the first charger 100). The controller 725 may be configured to disconnect or cause the power module 705 to stop (or reduce) transferring DC power should at least one of the power, the voltage and the current associated with the power module 705 exceed a threshold value. The controller 725 may be configured to disconnect or cause the power module 705 to stop (or reduce) transferring DC power should other signals associated with the first charger 100 indicate a parameter exceeds a threshold value.

The charging module 720 may be configured to charge the first battery pack 300a using power received from the power module 705. The charging module 720 may be configured to monitor a status of the first battery pack 300a. For example, the charging module 720 may measure a voltage, a current, a temperature and the like of the first battery pack 300a. The charging module 720 may be configured to monitor a charging status of the first battery pack 300a. For example, the charging module 720 may monitor whether or not the first battery pack 300a is fully charged or charging, an error associated with charging the first battery pack 300a and/or the like.

In some implementations, once the charging module 720 determines that the first battery pack 300a is fully charged, the controller 725 may direct power to charge the second battery pack 300b. In other words, the controller 725 may be configured to sequentially charge the first battery pack 300a and then the second battery pack 300b. In some implementations, the controller 725 may direct the charging modules 720 and 740 to supply a charge to both of the battery packs 300a and 300b. In other words, controller 725 may be configured to simultaneously charge the first battery pack 300a and the second battery pack 300b together.

The interface 710 may be configured to communicate with the interface 730 of the second charger 200 in order to facilitate communications between the first charger 100 and the second charger 200. The interface 730 may be configured to send communications from the second charger 200 to the interface 710 via the wire 715. The interface 730 may be configured to communicate the communications to the controller 750. The interface 730 may be configured as a conduit for receiving DC power from the first charger 100 via the wire 715 in order to charge the second battery pack 300b.

The controller 750 may be configured to communicate a detection of the second battery pack 300b, a desired voltage, current and/or power setting, an over temperature protection threshold, an over voltage protection threshold, an over current protection threshold, a communication time interval and/or the like. The desired voltage, current and/or power setting may be based on an amount of power desired to charge the second battery pack 300b and/or provide power to the second charger 200 (e.g., to power a processor, a memory, and the like). In some implementations, the controller 750 may be configured to negotiate with the first charger 100 based on a desired voltage, current and/or power setting. The desired voltage, current and/or power setting may include at least one of a power, a voltage, and/or a current.

In some implementations, the controller 750 may be configured to generate signals to protect the second charger 200 should an error (e.g., over current and/or high temperature) be indicated by the status and/or charge of the second battery pack 300b. For example, the controller 750 may be configured to disconnect or cause the second charger 200 to stop (or reduce) transferring DC power should an error condition be indicated by the status and/or charge of the second battery pack 300b. The controller 750 may be configured to disconnect or cause the second charger 200 to stop transferring DC power should a fully charged condition be indicated by the status and/or charge of the second battery pack 300b.

The controller 750 may be configured to receive signals from the charging module 740. The signals may indicate at least one of a power, a voltage and a current associated with the charging module 740 (and, therefore, the second battery pack 300b). The controller 750 may be configured to disconnect or cause the charging module 740 to stop (or reduce) charging the second battery pack 300b once the second battery pack 300b is fully charged.

In some implementations, the controller 750 may be configured to communicate a signal(s) to the first charger 100 indicating the error condition(s) exist via the wire 715 and the interface 730. The controller 750 may be configured to send a signal(s) to the first charger 100 indicating an error condition(s) exist (at the second charger 200) to stop (or reduce) transferring DC power via the wire 715 and the interface 710. In other words, the controller 750 may be configured to send a signal(s) to the power module 705 in the first charger 100 to stop (or reduce) directing power to the second charger 200 should an error condition exist at the second charger 200 as indicated by the received signal.

Figure 14:
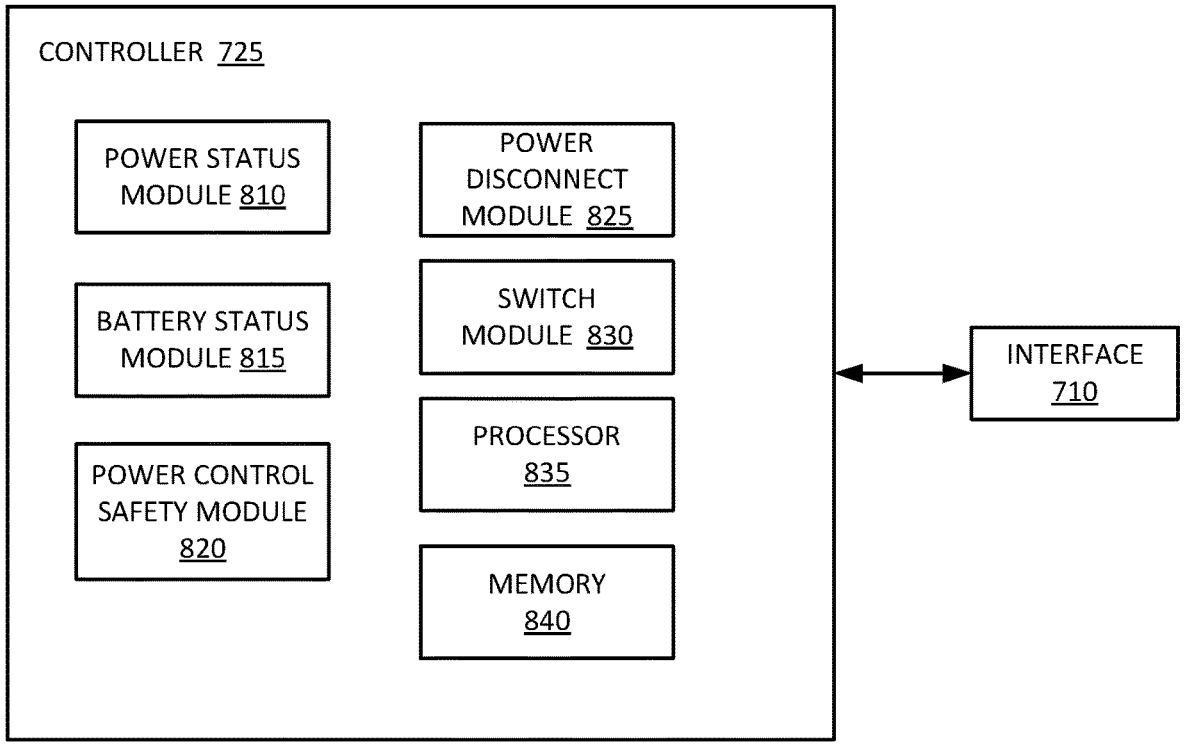
FIGS. 14 and 15 are schematic block diagrams of controllers according to at least one example embodiment.
Figure 15:
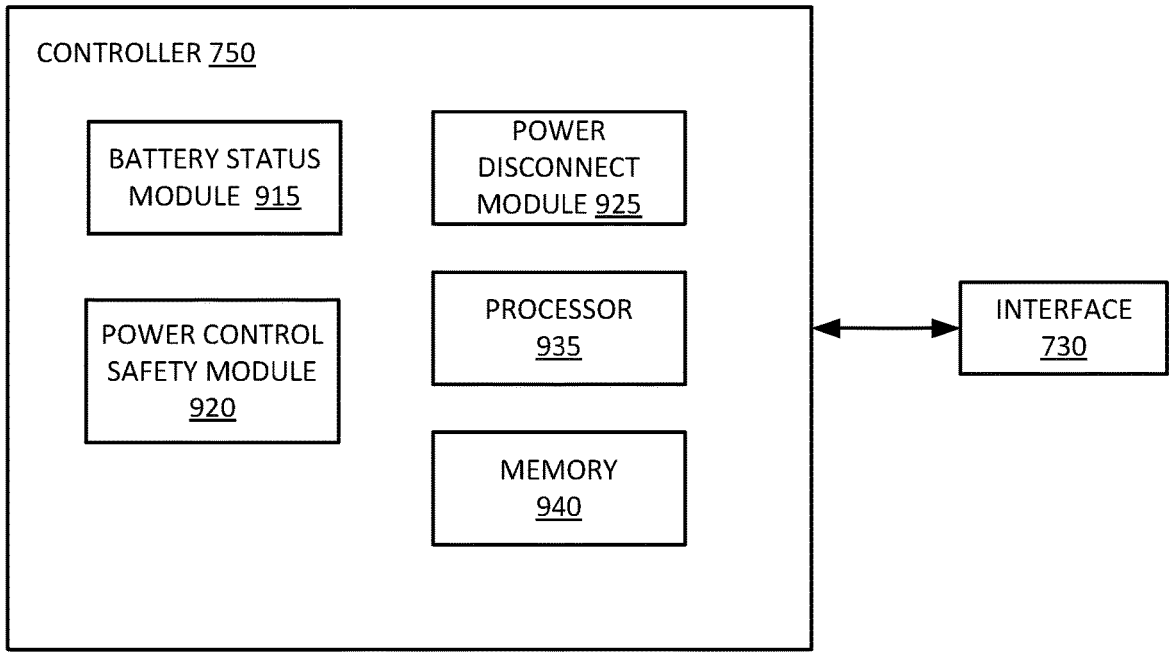

FIGS. 14 and 15 are schematic block diagrams of the controllers (control circuits) 725 and 750 according to at least one example embodiment. As shown in FIG. 14, the controller 725 of the first charger 100 includes a power status module 810, a battery status module 815, a power control safety module 820, a power disconnect module 825, a switch module 730, a processor 835, and a memory 840.

The power status module 810 may be configured to receive information related to the powering of the first charger 100. For example, the information may include at least one voltage, at least one current and/or at least one power associated with the first charger 100.

The battery status module 815 may be configured to receive information related to a status of the first battery pack 300a. For example, the information related to the status of first battery pack 300a may include a battery capacity, a charge amount, a time to full charge, a charging power, a charging status (e.g., full/charging), an error(s) associated with charging the battery and/or the like. In some implementations, the battery status module 815 may generate indicators based on the information related to the status of the first battery pack 300a.

The power control safety module 820 may be configured to receive measurable data (e.g., temperature, current, voltage, power) regarding the first charger 100 and/or the first battery pack 300a and determine if at least one of the measurable data exceeds a threshold value. If at least one of the measurable data exceeds a threshold value, the power control safety module 820 may be configured to output an error status to, for example, the power disconnect module 825.

The power disconnect module 825 may be configured to disconnect or cause the power module 705 to stop (or reduce) transferring DC power. For example, the power disconnect module 825 may receive an indicator from at least one of the power control safety module 820 and the power status module 810. The indicator may indicate a condition that can be corrected by reducing power output to the first charger 100. Accordingly, the power disconnect module 825 may instruct (e.g., change a setting associated with) the power module 705 to reduce an output power thus, for example, reducing temperature, current and/or voltage. The indicator may indicate a condition that can be corrected by stopping or disconnecting power output to the first charger 100. Accordingly, the power disconnect module 825 may instruct (e.g., change a setting associated with) the power module 705 to stop outputting power thus, for example, eliminating an over current and/or over voltage condition and/or a high temperature condition.

The switch module 830 may be configured to switch powering to the second charger 100 once the first battery pack 300a in the first charger 100 is fully charged. In some implementations, once the battery status module 815 indicates that the first battery pack 300a is fully charged, the switch module 830 may direct power to charge the second battery pack 300b. In other words, the switch module 830 may be configured to sequentially charge the first battery pack 300a and then the second battery pack 300b. In some implementations, the switch module 830 may direct the charging modules 720 and 740 to supply a charge to both of the battery packs 300a and 300b. In other words, switch module 830 may be configured to simultaneously charge the first battery pack 300a and the second battery pack 300b.

The processor 835 may be configured to execute instructions. For example, processor 835 can be associated with any of the components of the controller 725, and can be used for execution of any of the operations of the controller 725. The memory 840 may be configured to store instructions (e.g., as code segments) and/or data associated with implementing functions associated with the controller 725 and/or the first charger 100. In some implementations, the memory 840 may store threshold values to operate the power control safety module 820. For example, the threshold values may include an over temperature protection threshold, an over voltage protection threshold, an over current protection threshold and/or the like. In some implementations, the threshold values may include default threshold values and a protection value of the first battery pack 300a. For example, the power control safety module 820 may be configured to read and use the protection value(s) of the first battery pack 300a. In some implementations, the threshold values may include resetting the protection value(s) of the first charger 100 to the default threshold values. For example, the power control safety module 820 may be configured to reset the protection value(s) of the first charger 100 to the default threshold values. For another example, the power control safety module 820 may be configured to reset the protection value(s) of the first charger 100 to the default threshold values upon determining the first battery pack 300b has been disconnected from the first charger 100. In some implementations, the memory 840 may store battery historical charge and/or recondition/recalibration data.

As shown in FIG. 15, the controller 750 of the second charger 200 includes a battery status module 915, a power control safety module 920, a charge disconnect module 925, a processor 935, and a memory 940. The battery status module 915 may be configured to determine information related to the status and/or charge status of the second battery pack 300b. The information related to the status and/or charge status of second battery pack 300b may include a battery capacity, a charge amount, a time to full charge, a charging power, a charging status (e.g., full/charging), an error(s) associated with charging the battery and/or the like. The battery status module 915 may generate indicators based on the information related to the status and/or charge status of the second battery pack 300b. In some implementations, the indicators may be subsequently communicated to the first charger 100.

In some implementations, the battery status module 915 may be configured to calculate a value. For example, the battery status module 915 may calculate a battery capacity percentage based on a charge amount and a battery capacity.

The power control safety module 920 may be configured to receive measurable data (e.g., temperature, current, voltage, power) regarding the second charger 200 and/or the second battery pack 300b and determine if at least one of the measurable data exceeds a threshold value. If at least one of the measurable data exceeds a threshold value, the power control safety module 920 may be configured to output an error status to, for example, the power disconnect module 925. If at least one of the measurable data exceeds a threshold value, the power control safety module 920 may be configured to output an error status for communication to, for example, the first charger 100 via interface 630.

The power disconnect module 925 may be configured to disconnect or cause the battery status module 915 to stop (or reduce) charging of the second battery pack 300b. For example, the power disconnect module 925 may receive a signal from at least one of the power control safety module 920 and the battery status module 915. The signal may indicate a condition that can be corrected by reducing power to the second battery pack 300b. Accordingly, the power disconnect module 925 may instruct (e.g., change a setting associated with) the charging module 640 to reduce an output power thus, for example, reducing temperature, current and/or voltage of, for example, the second battery pack 300b. The signal may indicate a condition that can be corrected by stopping or disconnecting the second battery pack 300b from a charge (e.g., charge voltage). Accordingly, the power disconnect module 925 may instruct (e.g., change a setting associated with) the charging module 640 to stop outputting power thus, for example, eliminating an over current and/or over voltage condition and/or a high temperature condition.

The processor 935 may be configured to execute instructions. For example, the processor 935 can be associated with any of the components of the controller 750, and can be used for execution of any of the operations of the controller 750. The memory 940 may be configured to store instructions (e.g., as code segments) and/or data associated with implementing functions associated with the controller 750 and/or the second charger 200. In some implementations, the memory 940 may store threshold values to operate the power control safety module 920. For example, the threshold values may include an over temperature protection threshold, an over voltage protection threshold, an over current protection threshold and/or the like. In some implementations, the threshold values may include default threshold values and a protection value of the second battery pack 300b. For example, the power control safety module 920 may be configured to read and use the protection value(s) of the second battery pack 300b. In some implementations, the threshold values may include resetting the protection value(s) of the second charger 200 to the default threshold values. For example, the power control safety module 920 may be configured to reset the protection value(s) of the second charger 200 to the default threshold values. In another example, the power control safety module 920 may be configured to reset the protection value(s) of the second charger 200 to the default threshold values upon determining the second battery pack 300b has been disconnected from the second charger 200. In some implementations, the memory 940 may store battery historical charge and/or recondition/recalibration data.

As may be appreciated, the processor (or at least one processor) 835 and/or 935 may be formed on a substrate and may be utilized to execute instructions stored on the memory (or at least one memory) 840 and/or 940, so as to thereby implement the various features and functions described herein, or additional or alternative features and functions. Of course, the processor 835 and/or 935 and the memory 840 and/or 940 may be utilized for various other purposes. In particular, it may be appreciated that the memory 840 and/or 940 may be understood to represent an example of various types of memory and related hardware and software which might be used to implement any one of the modules described herein. Systems and/or methods described above and/or below may include data and/or storage elements. The data and/or storage elements (e.g., data base tables) may be stored in, for example, the memory 840 and/or 940.

The memory 840 and/or 940 may store information within the first charger 100 and/or the second charger 200. In one implementation, the memory 840 and/or 940 may be a volatile memory unit or units. In another implementation, the memory 840 and/or 940 may be a non-volatile memory unit or units. The memory 840 and/or 940 may also be another form of computer-readable medium, such as a magnetic or optical disk. The memory 840 and/or 940 may be a non-transitory computer readable medium.

Figure 16:
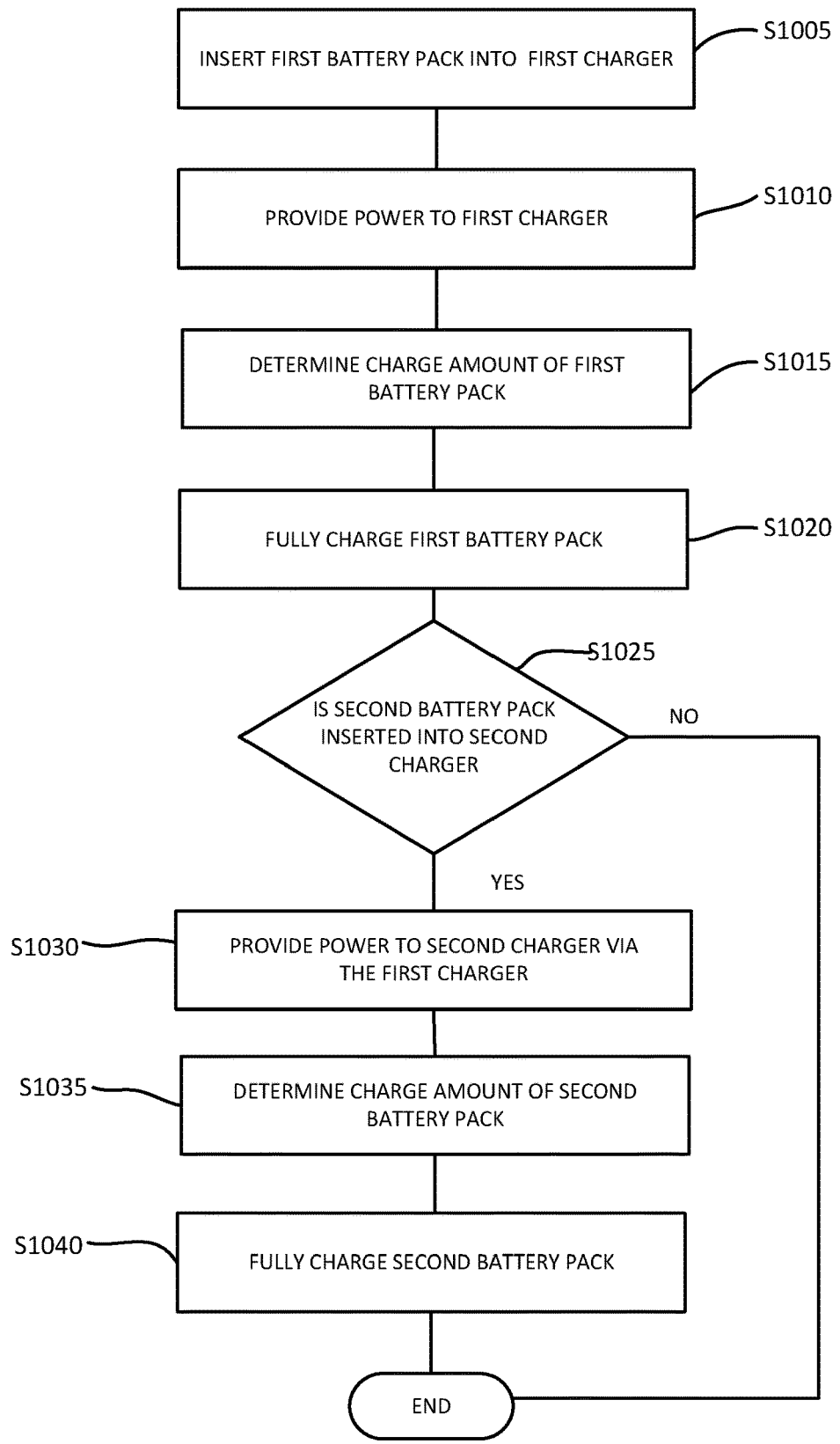
FIG. 16 is a flowchart of a method according to example embodiments.

FIG. 16 is a flowchart of a method according to example embodiments. The steps described with regard to FIG. 10 may be performed due to the execution of software code stored in a memory (e.g., at least one memory 840 and/or 940) associated with the first charger 100 and/or the second charger 200 and executed by at least one processor (e.g., at least one processor 835 and/or 935) associated with the first charger 100 and the second charger 200. However, alternative embodiments are contemplated such as a system embodied as a special purpose processor. Although the steps described below are described as being executed by a processor, the steps are not necessarily executed by a same processor. In other words, at least one processor may execute the steps described below with regard to FIG. 10.

As shown in FIG. 16, in step S1005 the first battery pack 300a is inserted into the first charger 100 to establish a communication link between the first battery pack 300a and the first charger 100. For example, the communication link may be associated with power, detection of battery, battery capacity, charge amount, time to full charge, charging power, charging status (e.g., full/charging), error(s) associated with charging the battery and/or the like.

In step S1010 power is delivered to and received by the first charger 100 (i.e., regulate power from a power source and distributing power from the power source to other components or modules within the first charger 100). In some implementations, at least one voltage, at least one current and/or at least one power associated with the first charger 100 (and/or first battery pack 300a) may be received by the first charger 100. For example, a voltage associated with the wall outlet, a converted voltage, and/or a current drawn may be communicated.

In step S1015 a charge amount of the first battery pack 300a may be determined to determine whether the first battery pack 300a requires a charge or not. In some implementations, the first charger 100 may charge the inserted first battery pack 300a with a constant charging current of 2 A, for example, until the first battery pack 300a is nearly fully charged. The charging current may be gradually tapered off (e.g., in a linear manner) to simulate a constant voltage charging mode. In other implementations, the charging currents generated by the first charger 100 may be in the range of approximately 0.1 A to approximately 5.0 A, although charging currents outside of this range may also be suitable.

In some implementations, step S1015 may be commencing while charging the second battery pack 300a in step S1035. In other words, steps S1015 and S1035 may be commencing simultaneously. Accordingly, both battery packs 300a and 300b may be charging at the same time.

Once the first battery pack 300a is fully charged at step S1020, the controller determines, at step S1025 whether there is a second battery pack 300b inserted into a second charger 200. If there is not a second battery pack 300b inserted into a second charger 200, the controller ends the process. If there is a second battery pack 300b inserted into a second charger 200, the controller proceeds to step S1030.

In step S1030, power is received and delivered to the second charger 200 via the first charger 100. Since power is only delivered to the first charger 100, the second charger 200 may receive power via the first charger 100.

In some implementations, the power may be delivered in a reverse direction (i.e., second charger 200 to first charger 100). That is, the power cord 425 may be connected to the second charger 200. For example, the power may be delivered to the second charger 200 (i.e., regulate power from a power source and distributing power from the power source to other components or modules within the second charger 200) and then deliver the power to the first charger 100. In other words, the first charger 100 receives power via the second charger 200.

In step S1035 a charge amount of the second battery pack 300b may be determined to determine whether the second battery pack 300b requires a charge or not. In some implementations, the second charger 200 may charge the second battery pack 300b (inserted in the second charger 200) with a constant charging current of 2 A, for example, until the second battery pack 300b is nearly fully charged. The charging current may be gradually tapered off (e.g., in a linear manner) to simulate a constant voltage charging mode. In other implementations, the charging currents generated by the second charger 200 may be in the range of 0.1 A to 5.0 A, although charging currents outside of this range may also be suitable.

In step S1040, once the second battery pack 300b is fully charged, the controller ends the process.

In some implementations, the charging of the first and second battery packs 300a, 300b may be performed simultaneously when both battery packs are inserted in their respective chargers 100, 200.

Example embodiments relate to a battery pack charger system designed to accommodate a slide-on style battery pack. While exemplary embodiments illustrated herein describe accommodating a slide-on style battery pack, the battery pack charger system may be used to charge other types of battery packs. For example, the battery pack charger system may charge a tower type battery packs. In some implementations, the battery pack charger system may charge different types of battery packs. For example, the one charger may charge a slide-on style battery pack and the other charger may charger a tower type battery pack.

The configurations, shapes, and sizes of the battery packs include but are not limited to configurations, shapes, and sizes of battery packs that are attachable to and detachable from electrical devices such as power tools, test and measurement equipment, vacuum cleaners, outdoor power equipment, and vehicles. Power tools include, for example, drills, circular saws, jigsaws, band saws, reciprocating saws, screw drivers, angle grinders, straight grinders, hammers, impact wrenches, angle drills, inspection cameras, and the like. Test and measurement equipment includes, for example, digital multimeters, clamp meters, fork meters, wall scanners, IR temperature guns, and the like. Vacuum cleaners include, for example, stick vacuums, hand vacuums, upright vacuums, carpet cleaners, hard-surface cleaners, canister vacuums, broom vacuums, and the like. Outdoor power equipment includes blowers, chain saws, edgers, hedge trimmers, lawn mowers, trimmers, and the like. Vehicles include, for example, automobiles, motorcycles, scooters, bicycles, and the like.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element or layer, there are no intervening elements or layers present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A battery pack charger system, comprising:
a first charger configured to charge a first battery pack;
a second charger configured to charge a second battery pack;
a support member arranged between the first charger and the second charger, the support member including a platform portion configured to support the first charger and the second charger and a projecting portion configured to support the first battery pack and the second battery pack, the projecting portion extending from the platform portion and configured to separate the first battery pack and the second battery pack from each other, the first charger attached on a first side of the support member and the second charger attached on a second side of the support member that is opposite the first side of the support member; and a power cord configured to deliver power, the power cord being connected to one of the first charger or the second charger, wherein the first battery pack and the second battery pack are arranged to directly face each other.

2. The battery pack charger system of claim 1, wherein the platform portion comprises:
a first pair of pedestals on the first side to be connected to a pair of screw bosses formed on the first charger; and
a second pair of pedestals on the second side to be connected to a pair of screw bosses formed on the second charger.

3. The battery pack charger system of claim 1, wherein the first charger includes a first connecting structure and the second charger includes a second connecting structure that is same as the first connecting structure.

4. The battery pack charger system of claim 3, wherein:
the first connecting structure includes guide rails configured to engage corresponding guide rails of a slide-on style battery pack, and
the second connecting structure includes guide rails configured to engage corresponding guide rails of a slide-on style battery pack.

5. The battery pack charger system of claim 1, wherein the first charger includes a controller configured to:
receive and deliver power associated with the first battery pack;
determine an amount of charge of the first battery pack; and
supply a charge to the first battery;
wherein the second charger includes a controller configured to:
deliver power to the second charger via the first charger;
determine an amount of charge of the second battery; and
supply a charge to the second battery.

6. The battery pack charger system of claim 1, further comprising a power brick configured to be attached to one of the first charger or the second charger.

7. The battery pack charger system of claim 6, wherein the power brick is encased in a casing to protect the power brick.

8. The battery pack charger system of claim 7, wherein the casing includes a pair of guide rails to corresponding engage with guide rails of one of the first battery charger or the second battery charger when one of the first battery pack or the second battery pack is removed from the respective first charger or the second charger.

9. The battery pack charger system of claim 7, wherein the casing includes openings to permit an electrical cord from the power brick to be wrapped within the openings.

10. A battery pack charger system, comprising:
a first charger;
a second charger;
a support member arranged between the first charger and the second charger, the support member including a platform portion and a projecting portion, the platform portion configured to support a plurality of terminals of the first charger and a plurality of terminals of the second charger, the projecting portion extending from the platform portion and configured to separate a first battery pack and a second battery pack from each other, the first charger attached on a first side of the support member and the second charger attached on a second side of the support member that is opposite the first side of the support member; and
a power brick configured to deliver power,
wherein the first battery pack and the second battery pack are arranged to directly face each other.

11. The battery pack charger system of claim 10, wherein the power brick is configured to be connected to one of the first charger or the second charger, and a battery pack is configured to be connected to the other first charger or the second charger.

12. The battery pack charger system of claim 10, wherein the power brick is encased in a casing, the casing includes a pair of guide rails to corresponding engage with guide rails of one of the first battery charger or the second battery charger.

13. The battery pack charger system of claim 10, wherein each of the first charger and the second charger comprises:
a housing configured to receive at least one of the power brick or the battery pack; and
a pair of reinforcing members, the pair of reinforcing members extending at sides of the housing.

14. The battery pack charger system of claim 13, wherein the pair of reinforcing members includes a securing device configured to secure an electrical cord of the power brick.

15. A method of forming a battery pack charger system including a first charger and a second charger, the method comprising:
arranging a support member between the first charger and the second charger, the support member includes a platform portion configured to support the first charger and the second charger and a projecting portion configured to support a first battery pack and a second battery pack, the projecting portion extending from the platform portion and configured to separate the first battery pack and the second battery pack from each other;
attaching the first charger to a first side of the support member;
attaching the second charger to a second side of the support member that is opposite the first side;
arranging the first battery pack and the second battery pack to directly face each other; and
delivering power via a power cord connected to one of the first charger or the second charger.

16. The method of claim 15, wherein the support member comprises:
a platform portion configured to support the first charger on the first side and the second charger on the second side; and
a projecting portion configured to support the first battery pack on the first side and the second battery pack on the second side.

17. The method of claim 16, wherein a height of the projecting portion separates the first battery pack and the second battery pack from each other.

* * * * *